(12) United States Patent
Hagio et al.

(10) Patent No.: US 11,276,193 B2
(45) Date of Patent: Mar. 15, 2022

(54) INFORMATION PROCESSING DEVICE

(71) Applicant: PANASONIC I-PRO SENSING SOLUTIONS CO., LTD., Fukuoka (JP)

(72) Inventors: Minoru Hagio, Fukuoka (JP); Nobuhito Seki, Fukuoka (JP); Keiichi Miyazaki, Fukuoka (JP); Kosuke Shinozaki, Fukuoka (JP); Masayuki Hasegawa, Fukuoka (JP); Shinichi Arai, Fukuoka (JP); Ryutaro Sen, Fukuoka (JP); Naoya Sakurai, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 158 days.

(21) Appl. No.: 16/728,506

(22) Filed: Dec. 27, 2019

(65) Prior Publication Data
US 2020/0211216 A1 Jul. 2, 2020

(30) Foreign Application Priority Data
Dec. 28, 2018 (JP) .............................. JP2018-248086

(51) Int. Cl.
| *G06K 9/00* | (2006.01) |
| *G06T 7/70* | (2017.01) |
| *G06T 7/246* | (2017.01) |
| *G06T 7/00* | (2017.01) |
| *G02B 7/00* | (2021.01) |
| *B60W 50/14* | (2020.01) |

(52) U.S. Cl.
CPC ............... *G06T 7/70* (2017.01); *B60W 50/14* (2013.01); *G02B 7/002* (2013.01); *G06T 7/0002* (2013.01); *G06T 7/248* (2017.01); *B60W 2050/143* (2013.01); *B60W 2420/42* (2013.01); *G06T 2207/30252* (2013.01)

(58) Field of Classification Search
None
See application file for complete search history.

(56) References Cited

U.S. PATENT DOCUMENTS

| 2016/0227173 | A1 | 8/2016 | Yamaguchi et al. |
| 2016/0371553 | A1* | 12/2016 | Farnham, IV ......... G07C 5/008 |
| 2018/0077390 | A1 | 3/2018 | Yamaguchi et al. |

(Continued)

FOREIGN PATENT DOCUMENTS

JP 2016-143894 A 8/2016

*Primary Examiner* — Wei Wen Yang
(74) *Attorney, Agent, or Firm* — Seed IP Law Group LLP

(57) ABSTRACT

An information processing device has a receiving section for receiving, from a second vehicle having started the tracking of a first person, the position information of the second vehicle and the image data photographed by the on-vehicle camera mounted on the second vehicle; a control section for searching for the image of the first vehicle included in the image data from the images photographed by monitoring cameras installed around the position indicated by the position information and for tracking the first vehicle searched for using the images photographed by the monitoring cameras; and a transmitting section for transmitting the tracking position information of the first vehicle being tracked by the control section.

11 Claims, 13 Drawing Sheets

(56) References Cited

U.S. PATENT DOCUMENTS

2018/0165963 A1* 6/2018 Lai .................... G06K 9/00805
2019/0110025 A1 4/2019 Yamaguchi et al.
2019/0110026 A1 4/2019 Yamaguchi et al.

* cited by examiner

INFORMATION PROCESSING DEVICE

CROSS-REFERENCE TO RELATED APPLICATIONS

This application is based on and claims priority under 35 USC 119 from Japanese Patent Application No. 2018-248086 filed on Dec. 28, 2018, the contents of which are incorporated herein by reference.

TECHNICAL FIELD

This disclosure relates to an information processing device.

BACKGROUND ART

Conventionally, wearable camera systems capable of improving convenience in the handling of image data photographed by wearable cameras or on-vehicle cameras and preventing image data from not being recorded have been proposed (for example, refer to Patent Document 1).

PRIOR ART DOCUMENT

Patent Document

Patent Document 1: JP-A-2016-143894

SUMMARY OF INVENTION

Numerous monitoring cameras are installed in streets. Methods enabling to support the tracking of a runaway vehicle or a runaway person having caused an incident or accident are being sought by using these monitoring cameras.

Non-limiting embodiments according to the disclosure provides an information processing device for supporting the tracking of the runaway vehicle or the runaway person.

An information processing device according to an aspect of this disclosure has a receiving section for receiving, from a second vehicle having started the tracking of a first vehicle, the position information of the second vehicle and the image data photographed by the on-vehicle camera mounted on the second vehicle; a control section for searching for the image of the first vehicle included in the image data from the images photographed by monitoring cameras installed around the position indicated by the position information and for tracking the first vehicle searched for using the images photographed by the monitoring cameras; and a transmitting section for transmitting the tracking position information of the first vehicle being tracked by the control section to the second vehicle.

An information processing device according to another aspect of this disclosure has a control section for searching for a first vehicle involved in an incident from the images photographed by monitoring cameras and for acquiring an installation position information of the monitoring camera having photographed the first vehicle searched for, and a transmitting section for transmitting instruction information instructing tracking of the first vehicle to a second vehicle traveling around a position indicated by the installation position information.

An information processing device according to a further aspect of this disclosure has a receiving section for receiving, from a wearable camera possessed by a second person having started the tracking of a first person, the position information of the wearable camera and the image data photographed by the wearable camera; a control section for searching for the image of the first person included in the image data from the images photographed by monitoring cameras installed around the position indicated by the position information and for tracking the first person searched for using the images photographed by the monitoring cameras; and a transmitting section for transmitting the tracking position information of the first person being tracked by the control section to the wearable camera.

An information processing device according to a still further aspect of this disclosure has a control section for searching for a person involved in an incident from the images photographed by monitoring cameras and for acquiring the installation position information of the monitoring camera having photographed the person searched for and a transmitting section for transmitting instruction information instructing tracking the person to a wearable camera or a vehicle existing around the position indicated by the installation position information.

These general or specific aspects may be achieved using a system, a device, a method, an integrated circuit, a computer program or a recording medium, or may also be achieved by an arbitrary combination of the system, the device, the method, the integrated circuit, the computer program or the recording medium.

According to an aspect of the disclosure, the present invention can support the tracking of a runaway vehicle or a runaway person.

Further advantages and effects in the aspect of this disclosure will be made clear upon reference to the specification and drawings. Although the advantages and/or effects are provided by some embodiments and features described in the specification and the drawings, all the features are not necessarily required to be provided in order to obtain one or more identical features.

DESCRIPTION OF EMBODIMENTS

Embodiments according to the present invention will be described in detail while appropriately referring to drawings. However, unnecessarily detailed descriptions are omitted in some cases. For example, detailed descriptions on matters known well and overlapping descriptions for substantially identical configurations are omitted in some cases. These omissions are done to avoid the following descriptions from becoming redundant and to make the following descriptions to be understood easily by a person skilled in the art.

The attached drawings and the following descriptions are provided so that a person skilled in the art can fully understand this disclosure and are not intended to limit the subject matters described in the claims.

First Embodiment

In a first embodiment, for example, a police vehicle starts the tracking of a runaway vehicle. After the police vehicle starts the tracking of the runaway vehicle, an information processing device (server) also tracks the runaway vehicle using images photographed by monitoring cameras installed in streets. Hence, for example, even if the police vehicle has missed the position of the runaway vehicle during the tracking, the police vehicle can receive the position information of the runaway vehicle from the server tracking the runaway vehicle using the images photographed by the monitoring cameras, thereby being capable of tracking the runaway vehicle again.

Figure 1:
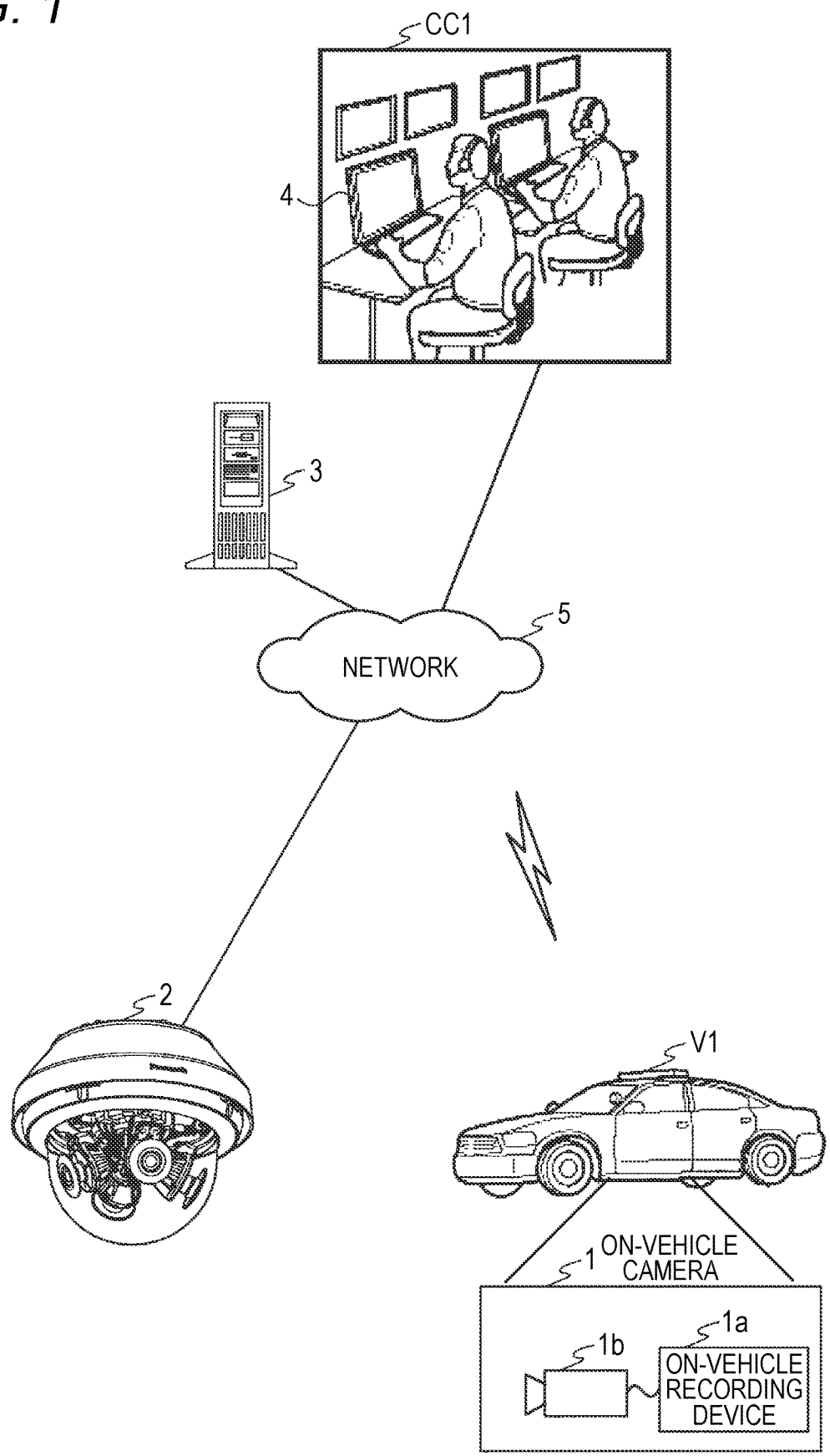
FIG. 1 is a view showing an example of a tracking support system according to a first embodiment.

FIG. 1 is a view showing an example of a tracking support system according to a first embodiment. As shown in FIG. 1, the tracking support system has an on-vehicle camera 1 mounted on a vehicle V1, monitoring cameras 2, a server 3, and terminal devices 4 installed in a command center CC1.

The vehicle V1 is, for example, a police vehicle. The vehicle V1 tracks a runaway vehicle having caused, for example, an incident or an accident and running away. The on-vehicle camera 1 mounted on the vehicle V1 has an on-vehicle recording device 1*a* and an imaging section 1*b*.

The on-vehicle recording device 1*a* is connected to an on-vehicle device, such as a rotating warning lamp or a siren on the vehicle V1. The on-vehicle recording device 1*a* controls the start and stop of the recording of images photographed by the imaging section 1*b* on the basis of signals output from the on-vehicle device. For example, when the rotating warning lamp is turned on, the on-vehicle recording device 1*a* starts the recording of images photographed by the imaging section 1*b*, and when the rotating warning lamp is turned off, the on-vehicle recording device 1*a* stops the recording of images photographed by the imaging section 1*b*. The on-vehicle recording device 1*a* communicates with the server 3 and the terminal device 4 via a network 5.

The imaging section 1*b* is installed on at least one of the windshield glass and the rear glass of the vehicle V1. The imaging section 1*b* photographs at least one of the front and rear of the vehicle V1.

The monitoring cameras 2 are fixedly installed on, for example, traffic signals, electric poles or the outer walls or the like of buildings in streets. The monitoring cameras 2 photograph, for example, roads in streets and also photograph traveling vehicles. The monitoring camera 2 may be, for example, a multi-camera equipped with a plurality of imaging sections and being capable of photographing in many directions. The monitoring cameras 2 communicate with the server 3 and the terminal device 4 via the network 5.

In the case that the vehicle V1 misses the position of a runaway vehicle, the server 3 supports the tracking of the runaway vehicle as described later. The server 3 communicates with the terminal device 4 via the network 5. The server 3 may be installed in the command center CC1.

The command center CC1 is, for example, the command center of a police station. The terminal devices 4 are installed in the command center CC1.

The images photographed by the on-vehicle camera 1 are displayed on the display device of the terminal device 4. In addition, the images photographed by the monitoring camera 2 are displayed on the display device of the terminal device 4. The operator operating the terminal device 4 transmits instructions or the like to the occupant of the vehicle V1 or a police officer patrolling streets on foot.

Examples of outline operation of the tracking support system shown in FIG. 1 are described below.

Figure 2A:
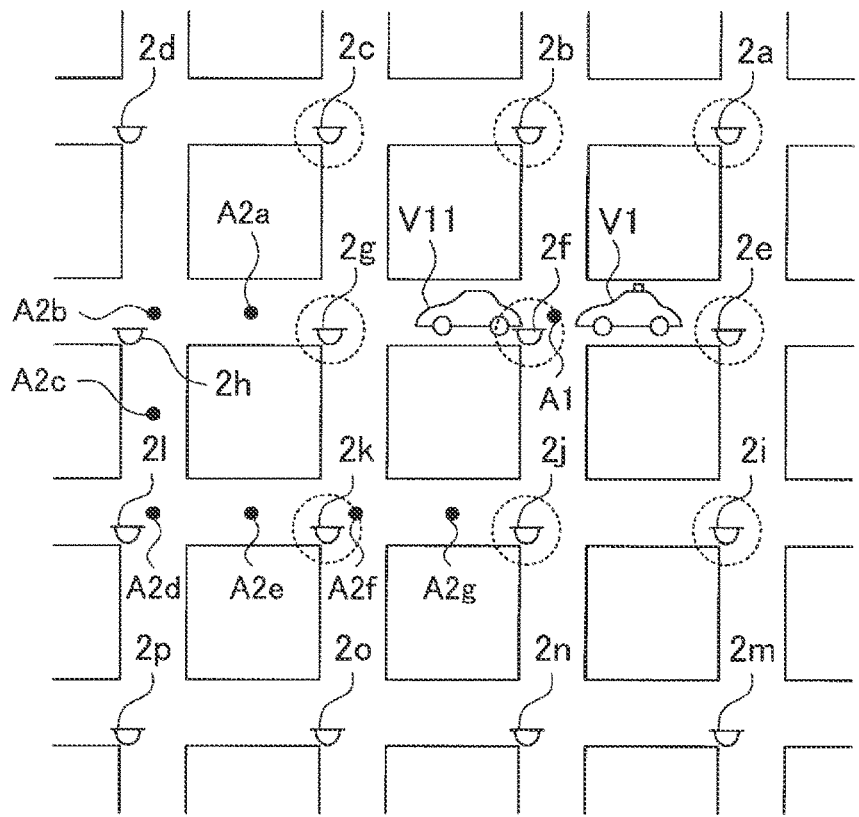
FIG. 2A is a view illustrating an example of outline operation of the tracking support system.
Figure 2B:
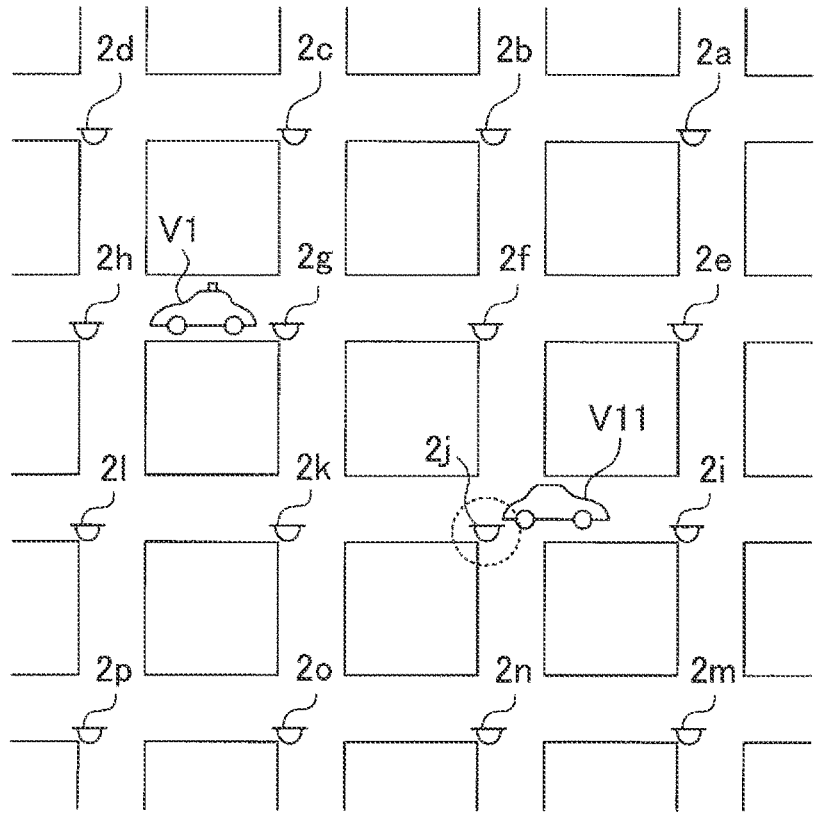
FIG. 2B is a view illustrating another example of outline operation of the tracking support system.

FIGS. 2A and 2B are views illustrating examples of outline operation of the tracking support system. Each of the monitoring cameras 2*a* to 2*p* shown in FIGS. 2A and 2B corresponds to the monitoring camera 2 described referring to FIG. 1.

The monitoring cameras 2*a* to 2*p* are installed, for example, at the corners of intersections and photograph vehicles traveling through the intersections (for example, vehicles entering and exiting the intersections). For example, the intersection at the position A1 shown in FIG. 2A is photographed by the monitoring camera 2*f*.

The vehicle V1 is shown in FIGS. 2A and 2B. Furthermore, a runaway vehicle V11 having caused an incident or an accident is shown in FIGS. 2A and 2B.

The vehicle V1 finds the runaway vehicle V11 at the position A1 shown in FIG. 2A and starts the tracking of the vehicle. In response to the start of the tracking, the on-vehicle camera 1 of the vehicle V1 acquires the position information of the vehicle V1, for example, on the basis of GPS (Global Positioning System) signals. The on-vehicle camera 1 acquires, for example, the position information (for example, the latitude or the longitude) at the position A1.

The on-vehicle camera 1 transmits the position information of the vehicle V1 acquired on the basis of to the GPS signals to the server 3. Furthermore, the on-vehicle camera 1 transmits the image data photographed by the imaging section 1*b* to the server 3. The image of the runaway vehicle V11 is included in the image data to be transmitted to the server 3, The server 3 searches for the image of the runaway vehicle V11 included in the image data transmitted from the on-vehicle camera 1 from the images photographed by the monitoring cameras installed around the position indicated by the position information transmitted from the on-vehicle camera 1 and selected from among the monitoring cameras 2*a* to 2*p* installed in streets.

For example, the server 3 extracts the monitoring cameras existing within a predetermined (or constant) distance (for example, within a circle having a radius of 1 km) from the position A1 and selected from among the monitoring cameras 2a to 2p installed in the streets. After extracting the monitoring cameras, the server 3 searches for the image of the vehicle having characteristics being coincident with those of the runaway vehicle V11, from the images photographed by the extracted monitoring cameras. More specifically, the server 3 searches for the image of the runaway vehicle V11 from the images photographed by the monitoring cameras 2a to 2c, 2e to 2g and 2i to 2k existing within the predetermined distance from the position A1, enclosed with the broken-line circles shown in FIG. 2A and selected from among the monitoring cameras 2a to 2p. The server 3 has the position information (for example, the latitudes or the longitudes) of the monitoring cameras 2a to 2p and can extract the monitoring cameras existing within the predetermined distance from the position A1.

In other words, when the vehicle V1 starts the tracking of the runaway vehicle V11, the server 3 searches for the image of the runaway vehicle V11 from the images photographed by the monitoring cameras installed around the position where the vehicle V1 has started the tracking of the runaway vehicle V11.

After searching for the image of the runaway vehicle V11, the server 3 tracks the runaway vehicle V11 searched for using the images photographed by the monitoring cameras 2a to 2p. For example, the server 3 monitors the images photographed by the monitoring cameras existing within a predetermined distance (for example, a circle having a radius of 1 km) and tracks the runaway vehicle V11. More specifically, the runaway vehicle V11 travels from the position A2a to the position A2g shown in FIG. 2A by traveling in the order of the position A2a, the position A2b, the position A2c, the position A2d, the position A2e, the position A2f and the position A2g. When the runaway vehicle V11 passes the position A2a, the server 3 monitors the images photographed by the monitoring cameras existing within the predetermined distance from the position A2a and tracks the runaway vehicle V11. When the runaway vehicle V11 passes the position A2b, the server 3 monitors the images photographed by the monitoring cameras existing within the predetermined distance from the position A2b and tracks the runaway vehicle V11. Similarly, when the runaway vehicle V11 passes from the positions A2c to A2g sequentially, the server 3 monitors the images photographed by the monitoring cameras 2 existing within the predetermined distance from each of the positions A2c to A2g and tracks the runaway vehicle V11 so that the image of the runaway vehicle V11 is not excluded from the images photographed by the monitoring cameras 2.

In other words, when the vehicle V1 starts the tracking of the runaway vehicle V11, the server 3 tracks the runaway vehicle V11 using the images photographed by the monitoring cameras 2a to 2p installed in the streets, independently from the vehicle V1.

In the case that the on-vehicle camera 1 of the vehicle V1 has missed the position of the runaway vehicle V11, the on-vehicle camera 1 requests the position information of the runaway vehicle V11 to the server 3. For example, in the case that the imaging section 1b does not photograph the runaway vehicle V11 for a certain period, the on-vehicle camera 1 determines that the on-vehicle camera 1 has missed the position of the runaway vehicle V11 and requests the position information of the runaway vehicle V11 to the server 3.

Upon receiving the request for the position information of the runaway vehicle V11 from the on-vehicle camera 1 of the vehicle V1, the server 3 acquires the position information of the runaway vehicle V11. For example, the server 3 acquires the position information of the monitoring camera photographing the runaway vehicle V11. More specifically, the monitoring camera 2j photographs the runaway vehicle V11 as shown in FIG. 2B. In this case, the server 3 acquires the position information of the monitoring camera 2j. The server 3 transmits the acquired position information (that is, the position information of the runaway vehicle V11) to the on-vehicle camera 1 of the vehicle V1.

Upon receiving the position information from the server 3, the on-vehicle camera 1 of the vehicle V1 displays the received position information on a display device. Or the on-vehicle camera 1 outputs the position information received from the server 3 by voice. Hence, for example, the vehicle V1 having missed the position of the runaway vehicle V11 can go to the position of the monitoring camera 2j shown in FIG. 2B.

In the case that the vehicle V1 has missed the position of the runaway vehicle V11 as described above, the server 3 transmits the position information of the runaway vehicle V11 to the vehicle V1. Hence, the vehicle V1 can early find the runaway vehicle V11.

Figure 3:
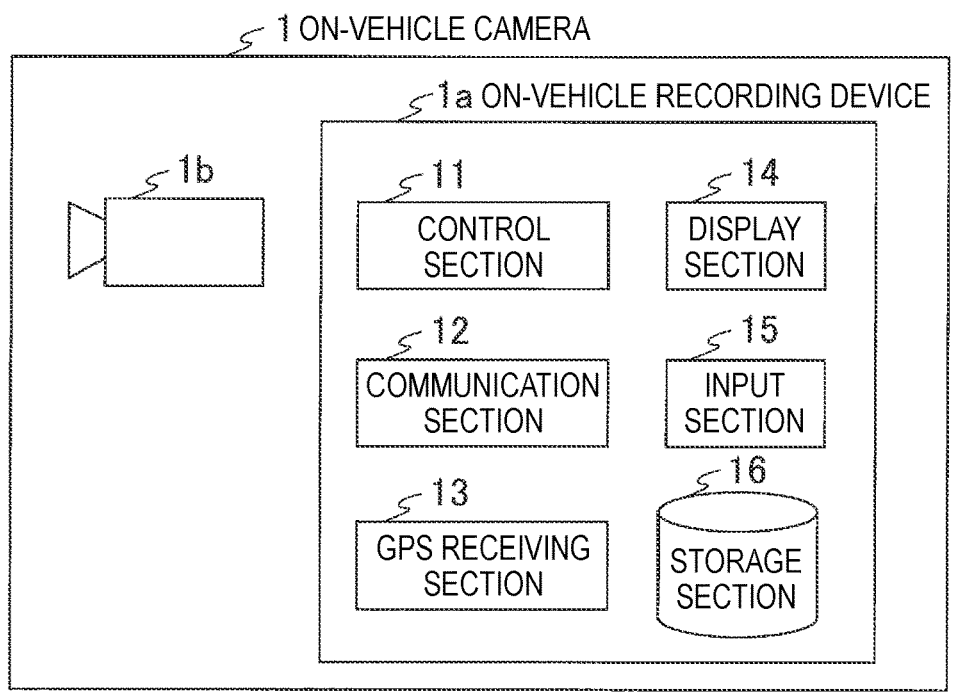
FIG. 3 is a view showing an example of a block configuration of an on-vehicle camera.

FIG. 3 is a view showing an example of a block configuration of the on-vehicle camera 1. As shown in FIG. 3, the on-vehicle camera 1 has the on-vehicle recording device 1a and the imaging section 1b.

The imaging section 1b has an imaging lens and an image sensor. The imaging section 1b outputs the signal (image data) output from the image sensor to the control section 11 of the on-vehicle recording device 1a.

The on-vehicle recording device 1a has a control section 11, a communication section 12, a GPS receiving section 13, a display section 14, an input section 15 and a storage section 16.

The control section 11 controls the entire on-vehicle camera 1. The control section 11 may be composed of a CPU (Central Processing Unit) or a DSP (Digital Signal Processor).

The communication section 12 communicates with the server 3 and the terminal device 4. The communication section 12 may communicate with the server 3 and the terminal device 4, for example, via a wireless communication network for mobile phones or the like and the Internet.

The GPS receiving section 13 receives the GPS signals from a plurality of GPS transmitters and calculates the position information of the vehicle V1. The GPS receiving section 13 outputs the calculated position information to the control section 11. The GPS receiving section 13 may output the GPS signals received from the plurality of plurality of GPS transmitters to the control section 11. After that, the control section 11 may calculate the position information of the vehicle V1 on the basis of the GPS signals received from the GPS receiving section 13.

The display section 14 is connected to the display device (not shown) installed inside the vehicle V1. The display section 14 outputs the image data output from the control section 11 to the display device.

The input section 15 is connected to an input device (not shown), such as a keyboard, a touch panel laid on the screen of the display device, or a mouse. The input section 15 receives a signal that is output from the input device in response to the operation of the user and then outputs the signal to the control section 11.

A program for operating the control section 11 is stored in the storage section 16. Furthermore, for example, data to be calculated by the control section 11 or data to be used by the control section 11 to control the various sections are stored in the storage section 16. Moreover, the image data photographed by the monitoring cameras 2 is stored in the storage section 16. The storage section 16 may be composed of a storage device, such as RAM (Random Access Memory), ROM (Read Only Memory), flash memory or HDD (Hard Disk Drive).

Figure 4:
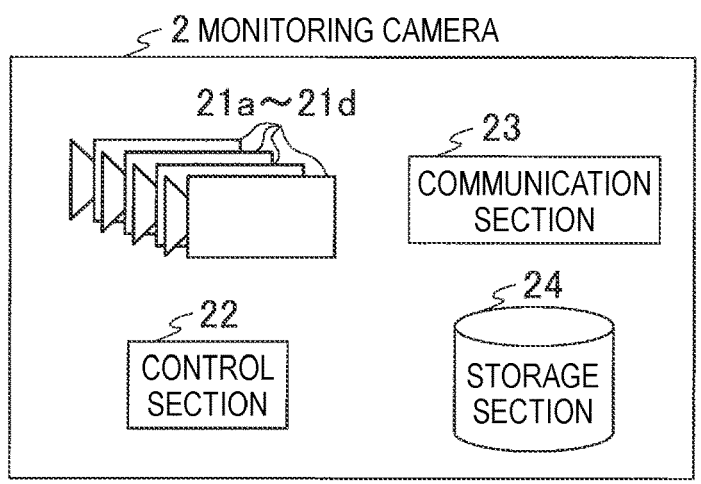
FIG. 4 is a view showing an example of a block configuration of a monitoring camera.

FIG. 4 is a view showing an example of a block configuration of the monitoring camera 2. As shown in FIG. 4, the monitoring camera 2 has imaging sections 21a to 21d, a control section 22, a communication section 23 and a storage section 24.

Each of the imaging sections 21a to 21d has an imaging lens and an image sensor. Each of the imaging sections 21a to 21d outputs the signal (image data) output from the image sensor to the control section 22. The photographing direction (optical axis) of each of the imaging sections 21a to 21d may be set so that the imaging section photographs each road of a four-road junction.

The control section 22 controls the entire monitoring camera 2. The control section 22 may be composed of, for example, a CPU or a DSP.

The communication section 23 communicates with the server 3 and the terminal device 4. The communication section 23 may communicate with the server 3 and the terminal device 4 via a network cable (by wire) such as an Ethernet (registered trademark) cable. Furthermore, the communication section 23 may communicate with the server 3 and the terminal device 4 via, for example, a wireless communication network for mobile phones or the like and the Internet.

A program for operating the control section 22 is stored in the storage section 24. Furthermore, for example, data to be calculated by the control section 22 or data to be used by the control section 22 to control the various sections are stored in the storage section 24. Moreover, the position information (for example, the latitude or the longitude) of the place where the monitoring camera 2 is installed is stored in the storage section 24. When the monitoring camera 2 installed, the control section 22 transmits the position information to the server 3. The storage section 24 may be composed of a storage device, such as RAM, ROM, flash memory or HDD.

Figure 5:
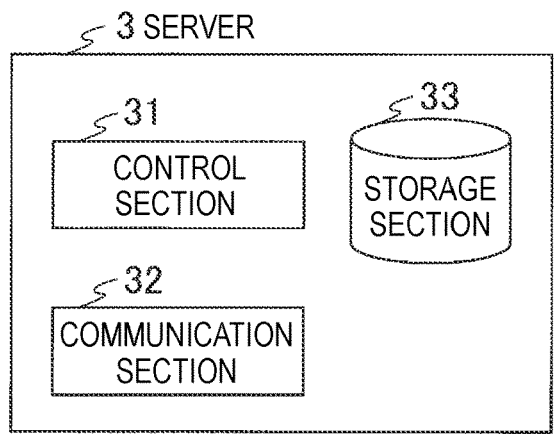
FIG. 5 is a view showing an example of a block configuration of a server.

FIG. 5 is a view showing an example of a block configuration of the server 3. As shown in FIG. 5, the server 3 has a control section 31, a communication section 32 and a storage section 33.

The control section 31 controls the entire server 3. The control section 31 may be composed of, for example, a CPU.

The communication section 32 communicates with the on-vehicle camera 1, the monitoring cameras 2 and the terminal device 4. The communication section 32 communicates with the terminal device 4 via, for example, the Internet.

A program for operating the control section 31 is stored in the storage section 33. Furthermore, for example, data to be calculated by the control section 31 or data to be used by the control section 31 to control the various sections are stored in the storage section 33. Moreover, the position information of the monitoring cameras 2 installed in the streets is stored in the storage section 33. For example, the control section 33 receives the identification information and position information of the monitoring cameras 2 from the monitoring cameras 2 installed in the streets and stores the received identification information and position information in the storage section 33 so that the identification information corresponds to the position information. Moreover, the image data of the images photographed by the on-vehicle camera 1 and the image data of the images photographed by the monitoring cameras 2 are stored in the storage section 33. The image data of the images photographed by the on-vehicle camera 1 and the monitoring cameras 2 may be stored in a device different from the server 3, such as a storage device. The storage section 33 may be composed of a storage device, such as RAM, ROM, flash memory or HDD.

Figure 6:
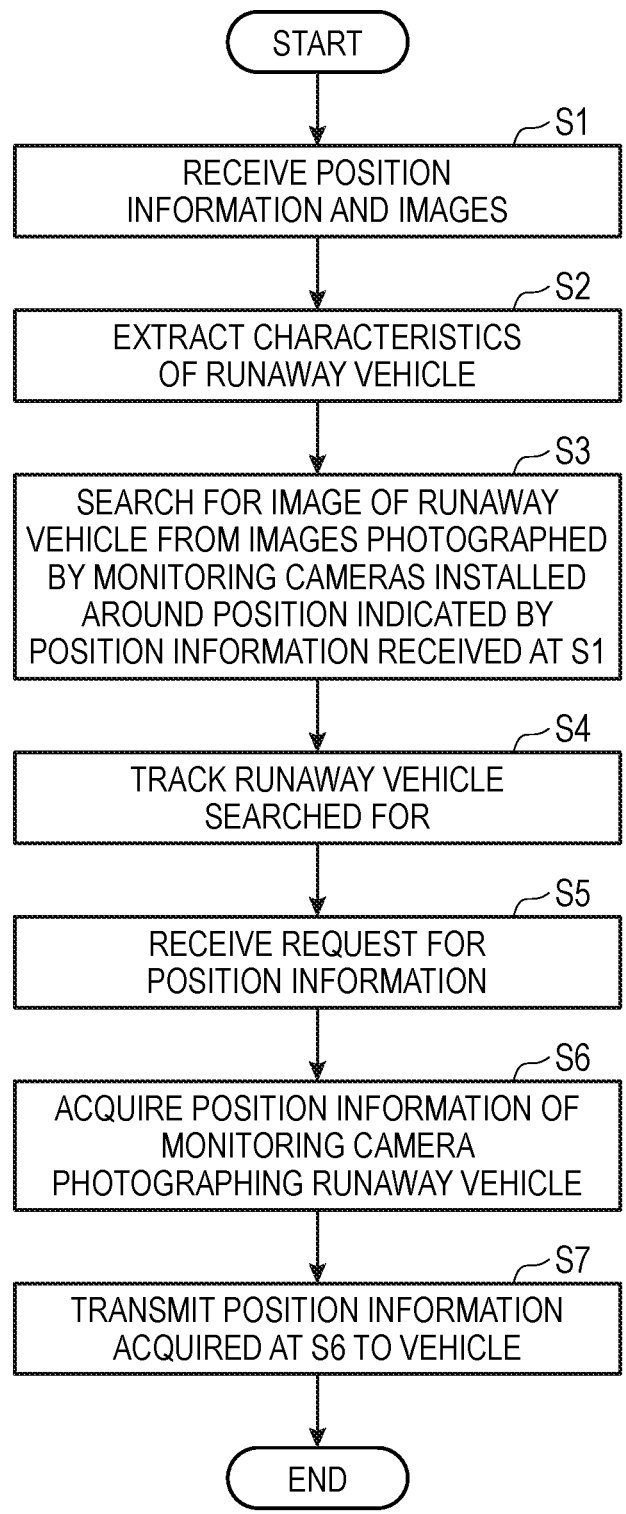
FIG. 6 is a flow chart showing an operation example of the server.

FIG. 6 is a flow chart showing an operation example of the server 3. The occupant of the vehicle V1 finds, for example, a suspicious vehicle. The suspicious vehicle notices the vehicle V1 and runs away. The occupant of the vehicle V1 turns on, for example, the switch of a rotary alarm lamp or a siren in order to track the vehicle running away (hereafter referred to as the runaway vehicle).

The control section 11 of the vehicle V1 acquires the current position information of the vehicle V1 from the GPS receiving section 13 in response to the ON operation of the switch of the rotary alarm lamp or the siren. Furthermore, the control section 11 of the vehicle V1 acquires the image data of the images photographed by the imaging section 1b. The images photographed by the imaging section 1b include the image of the runaway vehicle. The control section 11 of the vehicle V1 transmits the acquired position information of the vehicle V1 and the image data of the images photographed by the imaging section 1b to the server 3 via the communication section 12.

The control section 31 of the server 3 receives the position information of the vehicle V1 and the images (image data) photographed by the imaging section 1b of the on-vehicle camera 1 from the on-vehicle camera 1 via the communication section 32 (at step S1). The images transmitted from the on-vehicle camera 1 may be still images including the image of the runaway vehicle or may be a motion video for a certain time.

The control section 31 of the server 3 extracts the characteristics of the runaway vehicle from the images received at step S1 (at step S2). For example, the control section 31 of the server 3 extracts the type, color, shape, the number of the number plate, etc. of the runaway vehicle.

The control section 31 of the server 3 extracts the monitoring cameras 2 installed around the position indicated by the position information received at step S1. For example, the control section 31 of the server 3 extracts the monitoring cameras 2 positioned within a predetermined distance (for example, within a circle having a radius of 1 km) from the position indicated by the position information received at step S1. After extracting the monitoring cameras 2, the control section 31 of the server 3 receives the image data from the extracted monitoring cameras 2 and searches for the image of the vehicle having the characteristics of the runaway vehicle extracted at step S2 from the received images. In other words, the control section 31 of the server 3 searches for the image of the runaway vehicle from the images photographed by the monitoring cameras 2 installed around the position indicated by the position information received at step S1 (at step S3).

The control section 31 of the server 3 tracks the vehicle (runaway vehicle) searched for at step S3 using the images photographed by the monitoring cameras 2 (at step S4). For example, the control section 31 of the server 3 tracks the image of the runaway vehicle by monitoring the images photographed by the monitoring cameras 2 positioned within the predetermined distance from the moving runaway vehicle.

It is herein assumed that the vehicle V1 has missed the position of the runaway vehicle V11. The control section 11 of the vehicle V1 requests the position information of the runaway vehicle to the server 3 via the communication section 12. In the case that the image of the runaway vehicle has not become included in the images photographed by the imaging section 1*b* for a certain time (for example, one minute), the control section 11 of the vehicle V1 may request the position information of the runaway vehicle to the server 3. Furthermore, in the case that the input section 15 has received the operation for requesting the position information of the runaway vehicle from the occupant of the vehicle V1, the control section 11 of the vehicle V1 may request the position information of the runaway vehicle to the server 3. Moreover, in the case that the speed of the vehicle V1 becomes lower than a certain speed and the period in which the speed is lower than the certain speed continues for a certain time, the control section 11 of the vehicle V1 may request the position information of the runaway vehicle.

The control section 31 of the server 3 receives the request for the position information from the on-vehicle camera 1 of the vehicle V1 via the communication section 32 (at step S5).

Upon receiving the request for the position information from the on-vehicle camera 1 of the vehicle V1, the control section 31 of the server 3 acquires the position information of the monitoring camera 2 photographing the runaway vehicle (at step S6). For example, the control section 31 of the server 3 refers to the data stored in the storage section 33 on the basis of the identification information of the monitoring camera 2 photographing the runaway vehicle and acquires the position information of the monitoring camera 2 photographing the runaway vehicle.

After acquiring the position information of the monitoring camera 2, the control section 31 of the server 3 transmits the acquired position information to the on-vehicle camera 1 of the vehicle V1 (at step S7).

Upon receiving the position information of the runaway vehicle from the server 3, the control section 11 of the on-vehicle camera 1 may display the position information on the display device via the display section 14. Furthermore, upon receiving the position information of the runaway vehicle from the server 3, the control section 11 of the on-vehicle camera 1 may output the position of the runaway vehicle by voice from a voice output device, such as a speaker.

As described above, the communication section 32 of the server 3 receives the position information of the vehicle V1 and the image data photographed by the on-vehicle camera 1 mounted on the vehicle V1 from the vehicle V1 having started the tracking of the runaway vehicle. The control section 31 of the server 3 searches for the image of the runaway vehicle included in the image data from the images photographed by the monitoring cameras installed around the position indicated by the position information and selected from among the monitoring cameras 2 installed in the streets and tracks the runaway vehicle searched for using the images photographed by the monitoring cameras 2. After that, in response to the request from the vehicle V1, the communication section 32 of the server 3 transmits the position information of the runaway vehicle being tracked by the control section 31 to the vehicle V1.

Hence, even if the vehicle V1 has missed the position of the runaway vehicle, the server 3 can support the tracking of the runaway vehicle. Furthermore, in the case that the position information of the runaway vehicle is requested from the vehicle V1, the server 3 transmits the information to the vehicle V1. Therefore, while the occupant of the vehicle V1 can track the runaway vehicle, the occupant can concentrate on the tracking of the runaway vehicle without receiving the position information of the runaway vehicle.

Modification Example 1

In the above description, in the case that the vehicle V1 has missed the position of the runaway vehicle, the server 3 transmits the position information of the runaway vehicle to the vehicle V1. On the other hand, in the case that a police officer patrolling streets has missed a runaway person, the server 3 may transmit the position of the runaway person to a wearable camera possessed by the police officer.

Figure 7:
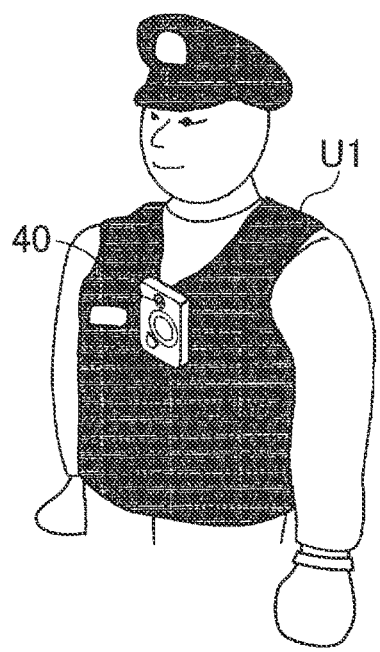
FIG. 7 is a view showing an example of the upper-half body of a user wearing a wearable camera.

FIG. 7 is a view showing an example of the upper-half body of a user U1 wearing a wearable camera 40. The user U1 is, for example, a police officer.

The wearable camera 40 is attached or held on the front section of the uniform of the user U1 so as to be able to photograph the area in front of the user U1. The wearable camera 40 may be fixed to the front section of the uniform, for example, in a state of being suspended from the neck by a string. The wearable camera 40 may be fixed to the front section of the uniform by engaging an attaching fixture (for example, an attaching clip) installed on the rear face of the housing of the wearable camera 40 with a fixture to be attached that is installed on the front section of the uniform.

Figure 8:
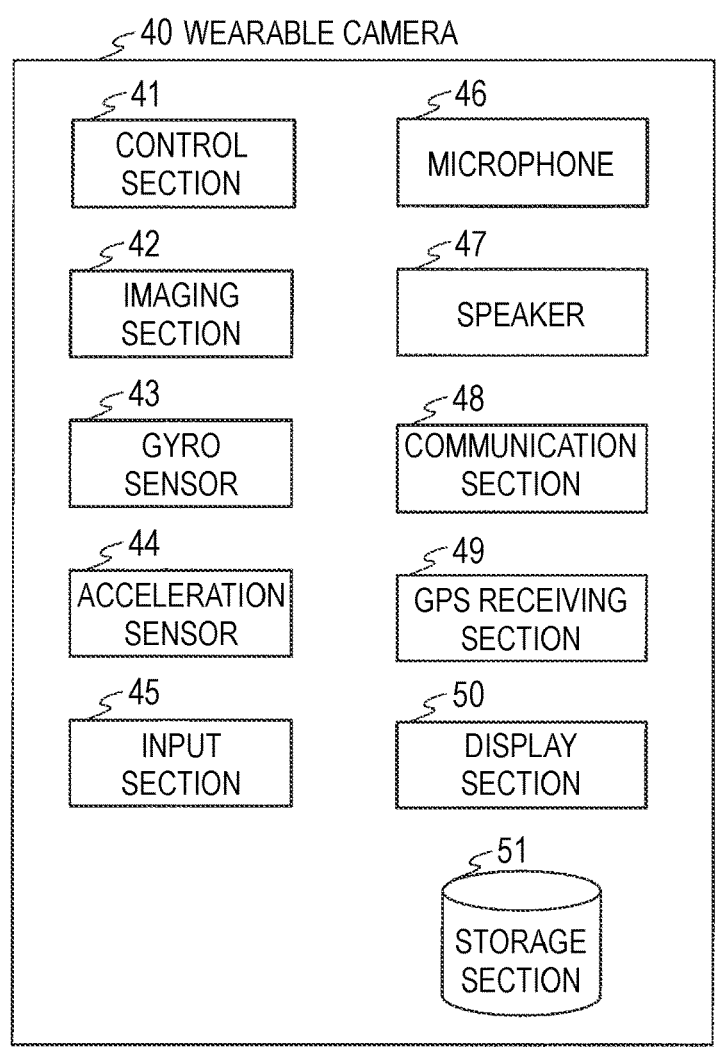
FIG. 8 is a view showing an example of a block configuration of the wearable camera.

FIG. 8 is a view showing an example of a block configuration of the wearable camera 40. As shown in FIG. 8, the wearable camera 40 has a control section 41, an imaging section 42, a gyro sensor 43, an acceleration sensor 44, an input section 45, a microphone 46, a speaker 47, a communication section 48, a GPS receiving section 49, a display section 50 and a storage section 51.

The control section 41 controls the entire wearable camera 40. The functions of the control section 41 may be achieved by a processor, such as a CPU or a DSP.

The imaging section 42 has an imaging lens and an image sensor. The imaging section 42 outputs the signal (image data) output from the image sensor to the control section 41.

The gyro sensor 43, for example, measures the angular speed around the three axes (the x, y and z axes) of an orthogonal coordinate system. The gyro sensor 43 outputs the measured angular speed signals to the control section 41.

The acceleration sensor 44, for example, measures the acceleration in the three-axis directions of an orthogonal coordinate system. The acceleration sensor 44 outputs the measured acceleration signals to the control section 41. The control section 41 can detect the motions of the user wearing the wearable camera 40, such as starting to walk, starting to run and falling, on the basis of the angular speed output from the gyro sensor 43 and the acceleration output from the acceleration sensor 44.

The input section 45 is connected to an input device (not shown), such as a switch. The input section 45 receives the signal corresponding to the operation of the user and output from the input device and then outputs the signal to the control section 41.

The microphone 46 collects sound around the wearable camera 40 and collects the voice of the user wearing the wearable camera 40. The microphone 46 outputs the collected sound signal to the control section 41.

The speaker 47 converts the voice signal output from the control section 41 into voice and then outputs the voice.

The communication section 48 communicates with the on-vehicle camera 1, the server 3 and the terminal device 4. The communication section 48 may communicate with the on-vehicle camera 1 through wireless communication, such as Wi-Fi (registered trademark) or Bluetooth (registered trademark). Furthermore, the communication section 48 may communicate with the server 3 and the terminal device 4, for example, via a wireless communication network for mobile phones or the like and the Internet.

The GPS receiving section 49 receives the GPS signals from a plurality of GPS transmitters and calculates the position information of the wearable camera 40. The GPS receiving section 49 outputs the calculated position information to the control section 41. The GPS receiving section 49 may output the GPS signals received from the plurality of plurality of GPS transmitters to the control section 41. After that, the control section 41 may calculate the position information of the wearable camera 40 on the basis of the GPS signals received from the GPS receiving section 49.

The display section 50 is connected to the display device (not shown) provided in the wearable camera 40. The display section 50 outputs the signal (image data) output from the control section 41 to the display device.

A program for operating the control section 41 is stored in the storage section 51. Furthermore, for example, data to be calculated by the control section 41 or data to be used by the control section 41 to control the various sections are stored in the storage section 51. Moreover, the image data of the images photographed by the imaging section 42 is stored in the storage section 51. The storage section 51 may be composed of a storage device, such as RAM, ROM, flash memory or HDD.

Figure 9:
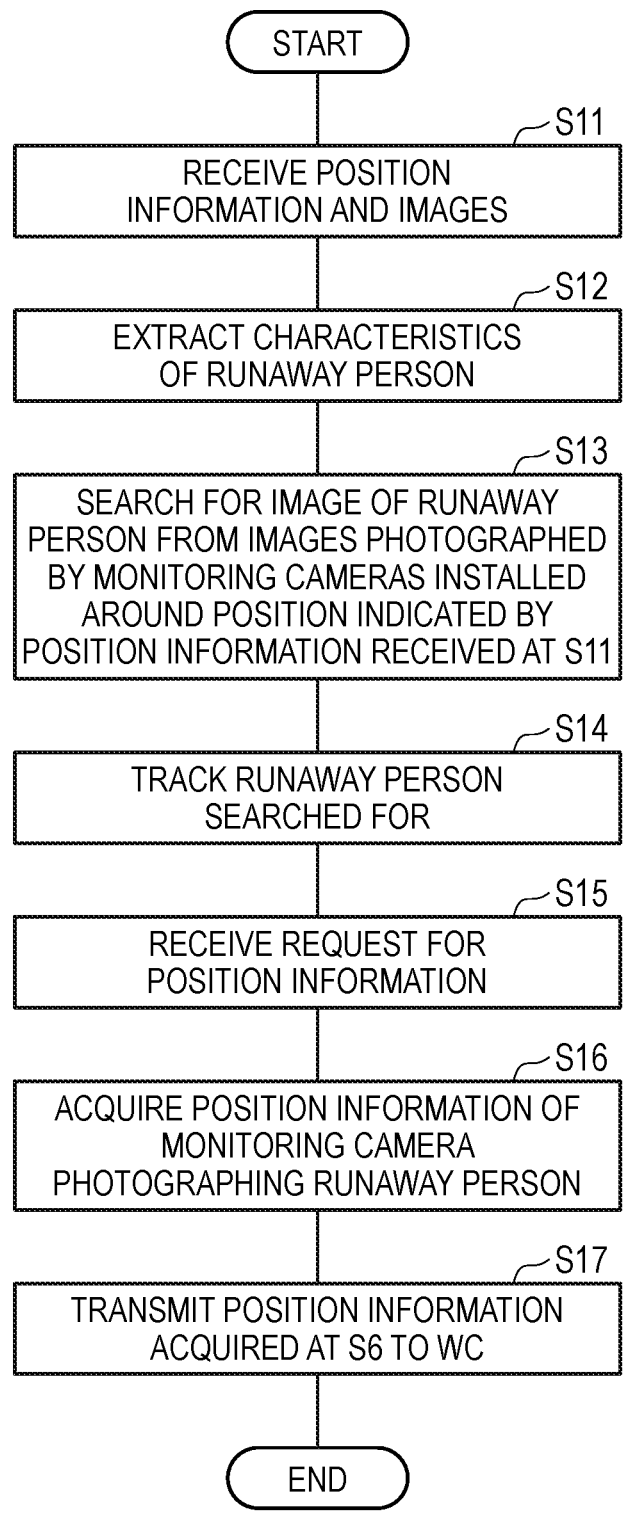
FIG. 9 is a flow chart showing an operation example of the server.

FIG. 9 is a flow chart showing an operation example of the server 3. The police officer wearing the wearable camera 40 finds, for example, a suspicious person. The suspicious person notices the police officer and runs away. The police officer, for example, starts running in order to track the suspicious person running away (hereafter referred to as the runaway criminal).

The control section 41 of the wearable camera 40 detects that the police officer has started running using the signals output from the gyro sensor 43 and the acceleration sensor 44. After detecting that the police officer has started running, the control section 41 of the wearable camera 40 acquires the current position information of the wearable camera 40 from the GPS receiving section 49. Furthermore, the control section 41 of the wearable camera 40 acquires the image data of the images photographed by the imaging section 42. The images photographed by the imaging section 42 include the image of the runaway person. The control section 11 of the wearable camera 40 transmits the acquired position information of the wearable camera 40 and the image data of the images photographed by the imaging section 42 to the server 3 via the communication section 48.

The control section 31 of the server 3 receives the position information of the wearable camera 40 and the images photographed by the imaging section 42 of the wearable camera 40 from the wearable camera 40 via the communication section 32 (at step S11). The images transmitted from the wearable camera 40 may be still images including the image of the runaway person or may be a motion video for a certain time.

The control section 31 of the server 3 extracts the characteristics of the runaway person from the images received at step S11 (at step S12). For example, the control section 31 of the server 3 extracts the height, physique, the color of clothing, etc. of the runaway person.

The control section 31 of the server 3 extracts the monitoring cameras 2 installed around the position indicated by the position information received at step S11. For example, the control section 31 of the server 3 extracts the monitoring cameras 2 positioned within a predetermined distance (for example, within a circle having a radius of 1 km) from the position indicated by the position information received at step S11. After extracting the monitoring cameras 2, the control section 31 of the server 3 receives the image data from the extracted monitoring cameras 2 and searches for the image of the person having the characteristics of the runaway person extracted at step S12. In other words, the control section 31 of the server 3 searches for the image of the runaway person from the images photographed by the monitoring cameras 2 installed around the position indicated by the position information received at step S11 (at step S13).

The control section 31 of the server 3 tracks the person (runaway person) searched for at step S13 using the images photographed by the monitoring cameras 2 (at step S14). For example, the control section 31 of the server 3 tracks the runaway person by monitoring the images photographed by the monitoring cameras 2 positioned within the predetermined distance from the moving runaway person.

It is herein assumed that the police officer has missed the position of the runaway person. The control section 41 of the wearable camera 40 requests the position information of the runaway person to the server 3 via the communication section 48. In the case that the image of the runaway person has not become included in the images photographed by the imaging section 42 for a certain time (for example, one minute), the control section 41 of the wearable camera 40 may request the position information of the runaway person to the server 3. Furthermore, in the case that the input section 45 has received the operation for requesting the position information of the runaway person from the police officer, the control section 41 of the wearable camera 40 may request the position information of the runaway person to the server 3. Moreover, the control section 41 of the wearable camera 40 detects the movement of the police officer on the basis of the acceleration information from the gyro sensor 43 and the acceleration sensor 44, and in the case that the moving speed of the police officer becomes lower than a certain speed and the period in which the speed is lower than the certain speed continues for a certain time, the control section 41 of the wearable camera 40 may request the position information of the runaway person.

The control section 31 of the server 3 receives the request for the position information from the wearable camera 40 via the communication section 32 (at step S15).

Upon receiving the request for the position information from the wearable camera 40, the control section 31 of the server 3 acquires the position information of the monitoring camera 2 photographing the runaway person (at step S16). For example, upon receiving the request for the position information from the wearable camera 40, the control section 31 of the server 3 acquires the position information of the monitoring camera 2 photographing the runaway person from the storage section 33.

After acquiring the position information from the monitoring camera 2, the control section 31 of the server 3 transmits the acquired position information to the wearable camera 40 (at step S17).

Upon receiving the position information of the runaway person from the server 3, the control section 41 of the wearable camera 40 may display the position information on the display device via the display section 50. Furthermore, upon receiving the position information of the runaway person from the server 3, the control section 41 of the wearable camera 40 may output the position of the runaway person by voice, for example, from the speaker 47.

As described above, the communication section 32 of the server 3 receives the position information of the wearable camera 40 and the image data photographed by the wearable camera 40 from the wearable camera 40 possessed by the police officer having started the tracking of the runaway person. The control section 31 of the server 3 searches for the image of the runaway person included in the image data from the images photographed by the monitoring cameras installed around the position indicated by the position information and selected from among the monitoring cameras installed in the streets and tracks the runaway person searched for using the images photographed by the monitoring cameras 2 installed in the streets. After that, in response to the request from the wearable camera 40, the communication section 32 of the server 3 transmits the position information of the runaway person being tracked by the control section 31 to the wearable camera 40.

Hence, even if the police officer has missed the position of the runaway person, the server 3 can support the tracking of the runaway person. Furthermore, in the case that the position information of the runaway person is requested from the wearable camera 40, the server 3 transmits the information to the wearable camera 40. Therefore, while the police officer can track the runaway person, the police officer can concentrate on the tracking of the runaway person without receiving the position information of the runaway person.

The wearable camera 40 may communicate with the server 3 via the on-vehicle camera 1.

Modification Example 2

In the flow chart of FIG. 6, the control section 11 of the vehicle V1 may acquire the position information of the vehicle V1 and the image data of the images photographed by the imaging section 1b periodically after the ON operation of the switch of the rotary alarm lamp or the siren. After that, the control section 11 of the vehicle V1 may transmit the position information and the image data acquired periodically to the server 3 periodically. The control section 31 of the server 3 may execute the processes at steps S1 to S4 each time the control section 31 receives the position information and the image data from the on-vehicle camera 1 of the vehicle V1.

Similarly, in the flow chart of FIG. 9, the control section 41 of the wearable camera 40 may acquire the position information of the wearable camera 40 and the image data of the images photographed by the imaging section 42 periodically after the police officer started running. After that, the control section 41 of the wearable camera 40 may transmit the position information and the image data acquired periodically to the server 3 periodically. The control section 31 of the server 3 may execute the processes at steps S11 to S14 each time the control section 31 receives the position information and the image data from the wearable camera 40.

Modification Example 3

Although the control section 31 of the server 3 extracts the monitoring cameras 2 existing within a predetermined distance from the position indicated by the position information received at step S1 in the process at step S3 of FIG. 6, the process for extraction is not limited to this process.

For example, the control section 31 of the server 3 may calculate the elapsed time from the reception time of the position information received at step S1 (the tracking start time of the vehicle V1) to the current time and may calculate the movable distance of the runaway vehicle on the basis of the calculated elapsed time. After that, the control section 31 of the server 3 may extract the monitoring cameras 2 positioned within the movable distance of the runaway vehicle from the position indicated by the position information received at step S1.

Figure 10:
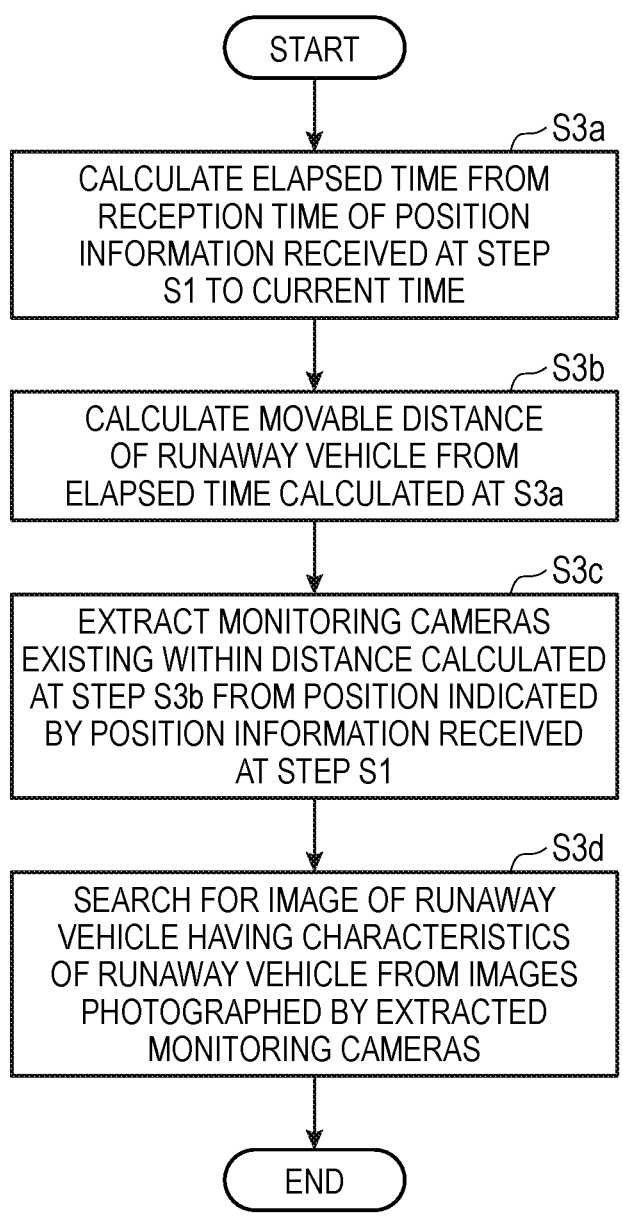
FIG. 10 is a flow chart showing a calculation example of the movable distance of a runaway vehicle calculated by the server.

FIG. 10 is a flow chart showing a calculation example of the movable distance of the runaway vehicle calculated by the server 3. The control section 31 of the server 3 may execute the processes of the flow chart shown in FIG. 10 instead of the process at step S3 of FIG. 6.

The control section 31 of the server 3 calculates the elapsed time from the reception time of the position information received at step S1 to the current time (at step S3a).

The control section 31 of the server 3 calculates the movable distance of the runaway vehicle (at step S3b). For example, the control section 31 of the server 3 multiplies the speed of the runaway vehicle by the elapsed time calculated at step S3a, thereby calculating the movable distance of the runaway vehicle. The speed of the runaway vehicle may be obtained by determining or (estimating) the speed of the runaway vehicle using the images (motion video for a certain time) received at step S1.

The control section 31 of the server 3 extracts the monitoring cameras 2 existing within the distance calculated at step S3b from the position indicated by the position information received at step S1 (at step S3c).

The control section 31 of the server 3 searches for the image of the vehicle having the characteristics of the runaway vehicle and received at step S1 from the images photographed by the monitoring cameras 2 extracted at step S3c (at step S3d).

Hence, the server 3 can suppress the image of the runaway vehicle from being searched for from the images photographed by the monitoring cameras 2.

The processes of the flow chart shown in FIG. 10 can also be applied to the process at step S13 of the flow chart shown in FIG. 9.

Modification Example 4

Although the control section 31 of the server 3 acquires the position information of the monitoring camera 2 photographing the runaway vehicle in the process at step S6 of FIG. 6 and transmits the acquired position information to the on-vehicle camera 1 of the vehicle V1 in the process at step S7, the processes at the steps are not limited to these processes.

For example, upon acquiring the position information of the monitoring camera 2 photographing the runaway vehicle in the process at step S6 of FIG. 6, the control section 31 of the server 3 may analyze the image photographed by the monitoring camera 2 having acquired the position information and may determine the runaway direction of the runaway vehicle. When transmitting the position information to the vehicle V1 at step S7, the control section 31 of the server 3 may include the runaway direction of the runaway vehicle in the position information.

As described above, the control section 31 of the server 3 determines the runaway direction of the runaway vehicle from the image photographed by the monitoring camera 2 photographing the runaway vehicle and transmits the position information including the determined runaway direction to the vehicle V1 via the communication section 32. Hence, the occupant of the vehicle V1 can estimate the runaway route of the runaway vehicle and can go ahead of the runaway vehicle.

The above-mentioned process for transmitting the runaway direction can also be applied to the processes at steps S16 and S17 of the flow chart shown in FIG. 9.

Modification Example 5

Although the control section 31 of the server 3 receives the request for the position information from the vehicle V1 having missed the position of the runaway vehicle at step S5 of FIG. 6, the process at the step is not limited to this process. The control section 31 of the server 3 may receive the image data from the on-vehicle camera 1 of the vehicle V1 and may analyze the image of the received image data and then may determine whether the vehicle V1 has missed the position of the runaway vehicle. For example, in the case that the image of the runaway vehicle has not become included in the images for a certain time (for example, 1 minute), the control section 31 of the server 3 may determine that the vehicle V1 has missed the position of the runaway vehicle. In the case that the control section 31 of the server 3 has determined that the vehicle V1 has missed the position of the runaway vehicle, the control section 31 may execute the process at step S6 of FIG. 6.

The above-mentioned process can be applied to the process at step S15 of FIG. 9. For example, in the case that the image of the runaway person has not become included in the images for a certain time (for example, 1 minute), the control section 41 of the wearable camera 40 may determine that the police officer possessing the wearable camera 40 has missed the position of the runaway person. In the case that the control section 41 of the wearable camera 40 has determined that the police officer has missed the position of the runaway person, the control section 41 may execute the process at step S16 of FIG. 9.

Modification Example 6

Although the control section 31 of the server 3 transmits the position information of the runaway vehicle being tracked to the vehicle V1 via the communication section 32 in response to the request from the vehicle V1, the transmission of the position information is not limited to be performed as described above. The control section 31 of the server 3 may transmit the position information of the runaway vehicle being tracked to the vehicle V1 via the communication section 32 periodically even if the position information is not requested from the vehicle V1. The on-vehicle camera 1 of the vehicle V1 may transmit the position information of the runaway vehicle being transmitted periodically from the server 3 to the occupant of the vehicle V1 periodically. Furthermore, when the occupant of the vehicle V1 has missed the position of the runaway vehicle, the on-vehicle camera 1 of the vehicle V1 may notify the position information of the runaway vehicle to the occupant of the vehicle V1.

Second Embodiment

In a second embodiment, the server 3 specifies, for example, the place where a hit-and-run incident has occurred using the images photographed by the monitoring cameras 2. After specifying the position of the place where the hit-and-run incident has occurred, the server 3 transmits instruction information instructing that the vehicle V1 (police vehicle) patrolling around the specified position should track the runaway vehicle. The configuration example of a tracking support system according to the second embodiment is similar to that of the tracking support system shown in FIG. 1. Furthermore, the function blocks of the on-vehicle camera 1, the monitoring cameras 2, the server 3 and the wearable camera 40 in the second embodiment are similar to the function blocks shown in FIGS. 3 to 5. However, the functions of the control sections 11, 22, 31 and 41 in the second embodiment are partly different from the functions of the control sections 11, 22, 31 and 41 in the first embodiment.

Figure 11:
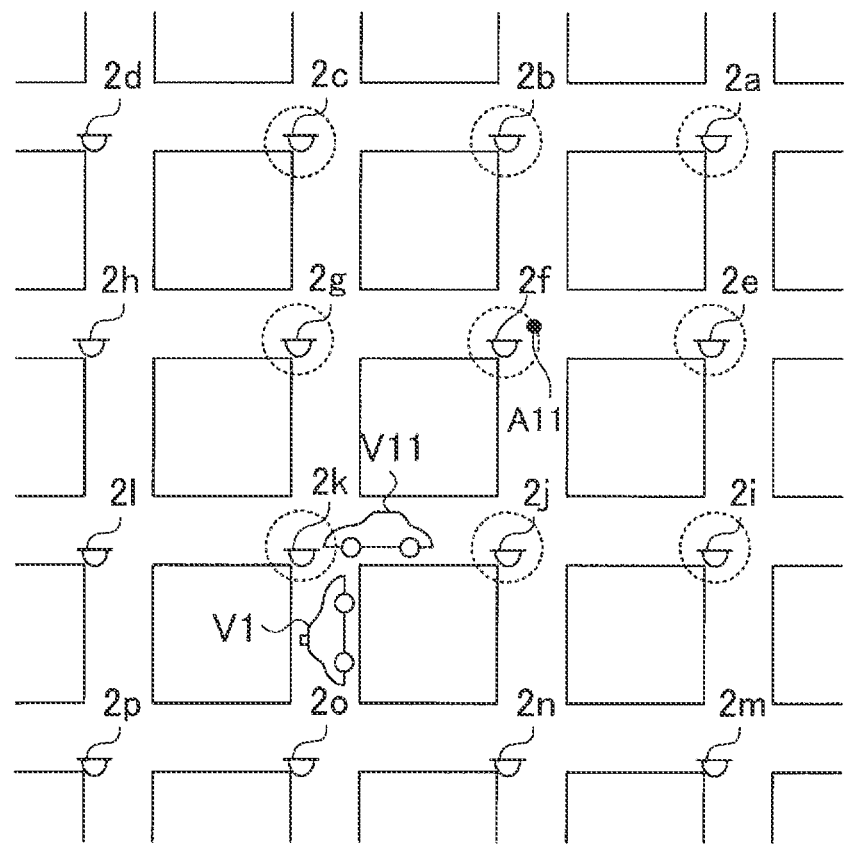
FIG. 11 is a view illustrating an example of outline operation of a tracking support system according to a second embodiment.

FIG. 11 is a view illustrating an example of outline operation of the tracking support system according to the second embodiment. In FIG. 11, the same components as those shown in FIG. 2A are designated by the same reference numerals and signs.

A hit-and-run incident has occurred at the position A11 shown in FIG. 11. The vehicle (runaway vehicle V11) having caused the hit-and-run incident runs away from the position A11. The intersection at the position A11 is photographed by the monitoring camera 2f.

The server 3 analyzes the images photographed by the monitoring cameras 2a to 2p and monitors, for example, the occurrence of incidents. The server 3 detects that the hit-and-run incident has occurred at the position A11 from the image photographed by the monitoring camera 2f.

After detecting the occurrence of the hit-and-run incident, the server 3 extracts the characteristics of the vehicle (runaway vehicle 11) having caused the hit-and-run incident from the image photographed when the hit-and-run incident has occurred. For example, the server 3 extracts the type, color, shape, the number of the number plate, etc. of the runaway vehicle V11.

After extracting the characteristics of the runaway vehicle V11, the server 3 acquires the position information of the monitoring camera 2f having photographed the hit-and-run incident. The server 3 searches for the image of the runaway vehicle V11 from the images photographed by the monitoring cameras installed around the position indicated by the acquired position information using the extracted characteristics of the runaway vehicle V11.

For example, the server 3 extracts the monitoring cameras existing within a predetermined distance (for example, within a circle having a radius of 1 km) from the monitoring camera 2f having photographed the hit-and-run incident and selected from among the monitoring cameras 2a to 2p installed in the streets. After extracting the monitoring cameras, the server 3 searches, from the images photographed by the extracted monitoring cameras, for the image of the vehicle having characteristics being coincident with those of the runaway vehicle V11. More specifically, the server 3 searches for the image of the runaway vehicle V11 from the images photographed by the monitoring cameras 2a to 2c, 2e to 2g and 2i to 2k existing within the predetermined distance from the position A11, enclosed with the broken-line circles shown in FIG. 11 and selected from among the monitoring cameras 2a to 2p.

After searching for the image of the runaway vehicle V11 from the images photographed by the monitoring cameras 2a to 2c, 2e to 2g and 2i to 2k, the server 3 acquires the position information of the monitoring camera photographing the runaway vehicle V11 searched for. For example, the runaway vehicle V11 is traveling in the intersection photographed by the monitoring camera 2k and the server 3 acquires the position information of the monitoring camera 2k.

After acquiring the position information of the monitoring camera 2k, the server 3 transmits instruction information instructing that the vehicle V1 traveling around the position indicated by the acquired position information (that is, the position around the monitoring camera 2k) should track the runaway vehicle V11. For example, the server 3 transmits instruction information instructing that the vehicle V1 traveling within a predetermined distance (for example, within a circle having a radius of 1 km) from the monitoring camera 2k having photographed the runaway vehicle V11 should track the runaway vehicle V11. The vehicle V1 calculates the position of the vehicle V1 periodically on the basis of the GPS signals and transmits the position to the server 3. Hence, the server 3 can grasp the position of the vehicle V1 traveling in the streets.

The instruction information to be transmitted to the vehicle V1 includes the position information of the monitoring camera 2k having photographed the runaway vehicle V11 (that is, the position information of the runaway vehicle V11). Furthermore, the instruction information may include image information, such as a still image, in which the runaway vehicle V11 is photographed. Hence, according to the position information included in the instruction information, the vehicle V1 can travel toward the position where the runaway vehicle V11 is running away.

In the case that an incident, such as a traffic accident, occurs in a street and the vehicle involved in the incident runs away, the server 3 specifies the position of the runaway vehicle V11 using the images photographed by the monitoring cameras as described above. And then, the server 3 transmits the instruction information instructing that the vehicle V1 positioned around the runaway vehicle should track the runaway vehicle. Hence, the vehicle V1 can early find the runaway vehicle V11.

Figure 12:
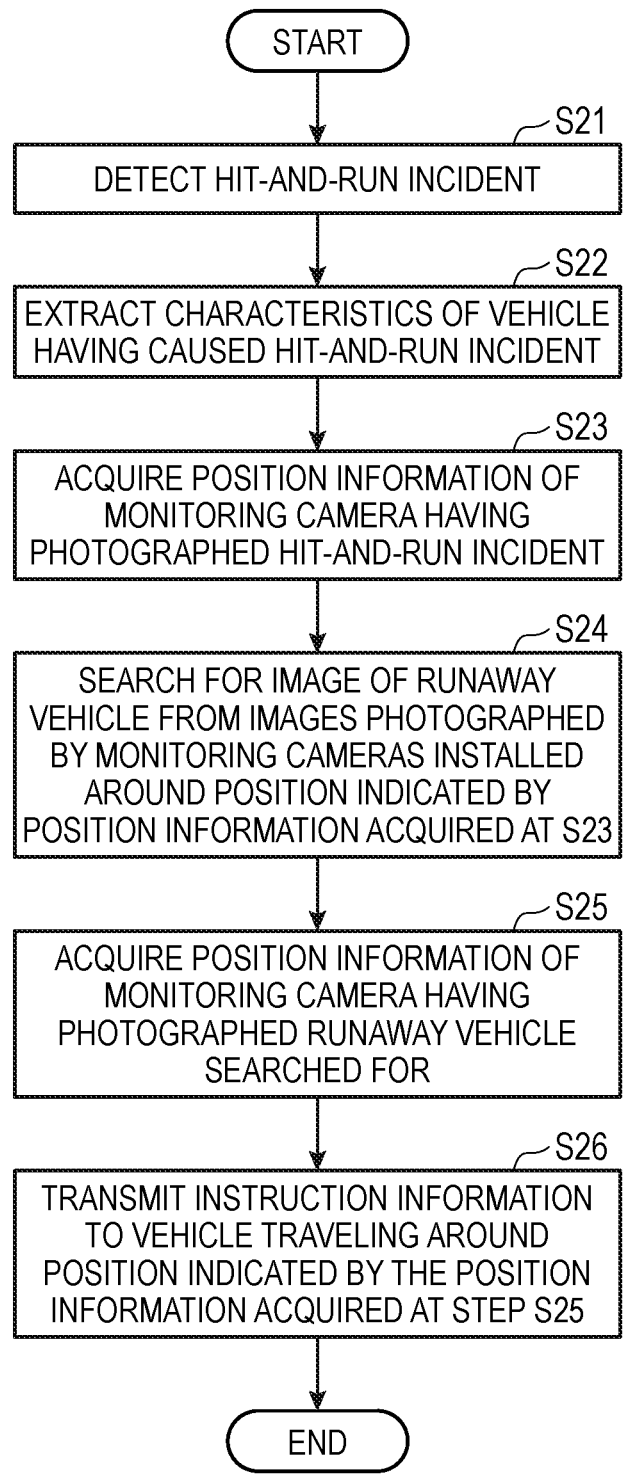
FIG. 12 is a flow chart showing an operation example of the server.

FIG. 12 is a flow chart showing an operation example of the server 3. The on-vehicle cameras of the police vehicles traveling in the streets, including the vehicle V1, acquire position information periodically on the basis of the GPS signals and transmit the information to the server 3.

The control section 31 of the server 3 receives the image data of the images photographed by the monitoring cameras 2 via the communication section 32. The control section 31 of the server 3 analyzes the images of the received image data and detects the occurrence of a hit-and-run incident (at step S21). The monitoring cameras 2 for detecting the occurrence of the hit-and-run incident may be cameras installed in one or more specific intersections. Furthermore, the monitoring cameras 2 for detecting the occurrence of the hit-and-run incident may be designated (selected), for example, by the terminal device 4.

Upon detecting the occurrence of the hit-and-run incident, the control section 31 of the server 3 extracts the characteristics of the vehicle (runaway vehicle) having caused the hit-and-run incident (at step S22). For example, the control section 31 of the server 3 extracts the type, color, shape, the number of the number plate, etc. of the runaway vehicle.

After extracting the characteristics of the runaway vehicle, the control section 31 of the server 3 acquires the position information of the monitoring camera 2 having photographed the hit-and-run incident (at step S23). For example, the control section 31 of the server 3 refers to the data stored in the storage section 33 on the basis of the identification information of the monitoring camera 2 having photographed the hit-and-run incident and then acquires the position information of the monitoring camera 2 having photographed the hit-and-run incident. In other words, the control section 31 of the server 3 acquires the position information of the place where the hit-and-run incident has occurred.

The order of the processes at steps S22 and S23 may be exchanged. In other words, the control section 31 of the server 3 may execute the process at step S23 first and then execute the process at step S22.

The control section 31 of the server 3 searches for the runaway vehicle from the images photographed by the monitoring cameras 2 installed around the position indicated by the position information acquired at step S23 (at step S24). For example, the control section 31 of the server 3 extracts the monitoring cameras existing within a predetermined distance (for example, within a circle having a radius of 1 km) from the monitoring camera having photographed the hit-and-run incident and searches for the image of the vehicle (runaway vehicle) having characteristics being coincident with the characteristics extracted at step S22 from the images photographed by the extracted monitoring cameras.

After searching for the image of the runaway vehicle, the control section 31 of the server 3 acquires the position information of the monitoring camera 2 having photographed the runaway vehicle searched for (at step S25). For example, the control section 31 of the server 3 refers to the data stored in the storage section 33 on the basis of the identification information of the monitoring camera 2 having photographed the runaway vehicle searched for and acquires the position information of the monitoring camera 2 having photographed the runaway vehicle.

The control section 31 of the server 3 transmits, via the communication section 32, instruction information instructing that the on-vehicle camera 1 of the vehicle V1 traveling around the position indicated by the position information acquired at step S25 should track the runaway vehicle (at step S26).

The position information of the monitoring camera 2 having acquired at step S25 is included in the instruction information by the control section 31 of the server 3. Upon receiving the instruction information from the server 3, the on-vehicle camera 1 of the vehicle V1 displays a screen instructing the tracking of the runaway vehicle on the display device. Furthermore, the on-vehicle camera 1 of the vehicle V1 displays the position information and the image information included in the instruction information. Moreover, the on-vehicle camera 1 of the vehicle V1 may output the instruction for the tracking of the runaway vehicle and the position information by voice.

As described above, the control section 31 of the server 3 searches for the image of the vehicle (runaway vehicle) involved in the incident from the images photographed by the monitoring cameras 2 installed in the streets and acquires the position information of the monitoring camera having photographed the runaway vehicle searched for. After that, the communication section 32 of the server 3 transmits the instruction information instructing that the vehicle V1 traveling around the position indicated by the position information of the monitoring camera having photographed the runaway vehicle should track the runaway vehicle. Consequently, the server 3 can support the tracking of the vehicle involved in incidents, such as a hit-and-run incident.

Modification Example 1

Although the server 3 transmits the instruction information for tracking the runaway vehicle to the vehicle V1 in the above description, the information to be transmitted is not limited to this instruction information. For example, the server 3 may transmit, to the wearable camera 40 possessed by a police officer, instruction information for tracking, for example, a runaway criminal running away. In this case, the control section 41 of the wearable camera 40 acquires the position information of the wearable camera 40 periodically on the basis of the GPS signals and transmits the position information to the server 3. The control section 31 of the server 3 transmits the instruction information instructing that the police officer (wearable camera 40) patrolling around the position indicated by the position information acquired at step S25 should track the runaway criminal in the process at step S26 of FIG. 12. Of course, the control section 31 of the server 3 may transmit instruction information instructing that the vehicle V1 traveling around the position indicated by the position information acquired at step S25 should track the runaway criminal.

As described above, the control section 31 of the server 3 searches for the image of the person (runaway person) involved in the incident from the images photographed by the monitoring cameras 2 installed in the streets and acquires the position information of the monitoring camera having photographed the runaway person searched for. After that, the communication section 32 of the server 3 transmits the instruction information instructing that the wearable camera 40 or the vehicle V1 existing around the position indicated by the position information should track the runaway person. Consequently, the server 3 can support the tracking of the runaway person involved in the incident.

Modification Example 2

Although the control section 31 of the server 3 detects a hit-and-run incident by image analysis in the above description, the method for detection is not limited to this method. For example, the control section 31 of the server 3 may receive the occurrence place of the hit-and-run incident and the characteristics of the runaway vehicle from the terminal device 4 of the command center CC1, instead of performing the processes at steps S21 to S23 of FIG. 12.

For example, the operator of the command center CC1 receives the notification of a hit-and-run incident from a witness having witnessed the hit-and-run incident. The operator hears about the occurrence place of the hit-and-run incident and the characteristics of the runaway vehicle from the witness. The operator inputs the occurrence place (position information) of the hit-and-run incident and the characteristics of the runaway vehicle having heard from the witness to the terminal device 4 and transmits the occurrence place and the characteristics to the server 3.

Upon receiving the position information of the occurrence place of the hit-and-run incident and the characteristics of the runaway vehicle from the terminal device 4, the server 3 searches for the image of the vehicle (runaway vehicle) having characteristics being coincident with the characteristics received from the terminal device 4 from the images photographed by the monitoring cameras 2 installed around the position indicated by the position information received from the terminal device 4. For example, the control section 31 of the server 3 extracts the monitoring cameras 2 installed within a predetermined distance (for example, within a circle having a radius of 1 km) from the position indicated by the position information received from the terminal device 4. The control section 31 of the server 3 searches for the image of the vehicle having the characteristics being coincident with the characteristics of the runaway vehicle received from the terminal device 4 from the images photographed by the extracted monitoring cameras.

After searching for the image of the runaway vehicle, the server 3 executes the processes at steps S25 and S26 shown in FIG. 12.

As described above, the server 3 may specify the position of the runaway vehicle on the basis of the information (the information on the position where the hit-and-run incident has occurred and the characteristics of the runaway vehicle) relating to the hit-and-run incident and transmitted from the terminal device 4 of the command center CC1. Also with this method, the server 3 can support the tracking of the vehicle involved in incidents, such as a hit-and-run incident.

Modification Example 3

Although the control section 31 of the server 3 extracts the monitoring cameras 2 existing within a predetermined distance from the position indicated by the position information acquired at step S23 in the process at step S24 of FIG. 12, the process for extraction is not limited to this process.

For example, the control section 31 of the server 3 may calculate the elapsed time from the reception time of the position information acquired at step S23 to the current time and may calculate the movable distance of the runaway vehicle on the basis of the calculated elapsed time. After that, the control section 31 of the server 3 may extract the monitoring cameras 2 positioned within the movable distance of the runaway vehicle from the position indicated by the position information acquired at step S23. The control section 31 of the server 3 can extract the monitoring cameras 2 installed within the movable distance of the runaway vehicle by performing the processes similar to the processes of the flow chart shown in FIG. 10.

The control section 31 of the server 3 may calculate the elapsed time from the time when the operator of the command center CC1 received the notification of the hit-and-run incident to the current time. After that, the control section 31 of the server 3 may calculate the movable distance of the runaway vehicle on the basis of the calculated elapsed time. The control section 31 of the server 3 receives, via the communication section 32, the time when the operator of the command center CC1 received the notification of the hit-and-run incident from the terminal device 4.

Modification Example 4

Although the control section 31 of the server 3 acquires the position information of the monitoring camera 2 having photographed the runaway vehicle in the process at step S25 of FIG. 12 and transmits the instruction information including the acquired position information and image information to the on-vehicle camera 1 of the vehicle V1 in the process at step S26, processes to be executed are not limited to these processes.

For example, after acquiring the position information of the monitoring camera 2 photographing the runaway vehicle in the process at step S25 of FIG. 12, the control section 31 of the server 3 may determine the runaway direction of the runaway vehicle by analyzing the image photographed by the monitoring camera 2, the position information of which has been acquired. When transmitting the instruction information to the vehicle V1 at step S26, the control section 31 of the server 3 may include the runaway direction of the runaway vehicle in the instruction information.

As described above, the control section 31 of the server 3 determines the runaway direction of the runaway vehicle from the image having photographed by the monitoring camera 2 photographing the runaway vehicle and transmits the instruction information including the determined runaway direction to the vehicle V1 via the communication section 32. Hence, the occupant of the vehicle V1 can estimate the runaway route of the runaway vehicle and can go ahead of the runaway vehicle. The control section 31 of the server 3 may transmit the instruction information including the runaway direction of a runaway person to the police officer possessing the wearable camera 40 or to the vehicle V1.

Modification Example 5

Although a hit-and-run incident is described above, the tracking support system is not limited to be applied to hit-and-run incidents. The tracking support system can also be applied to the tracking of, for example, vehicles and persons involved in crimes such as robbery.

Third Embodiment

In some places in streets, no monitoring camera is installed. In a third embodiment, the on-vehicle camera mounted on a vehicle or the wearable camera possessed by a police officer is used instead of the monitoring camera in such a place where no monitoring camera is installed. The configuration example of the tracking support system according to the third embodiment is similar to that of the tracking support system shown in FIG. 1. Furthermore, the function blocks of the on-vehicle camera 1, the monitoring camera 2, the server 3 and the wearable camera 40 in the third embodiment are similar to the function blocks shown in FIG. 3 to 5. However, the functions of the control sections 11, 22, 31 and 41 in the third embodiment are partly different from the functions of the control sections 11, 22, 31 and 41 in the first embodiment.

Figure 13:
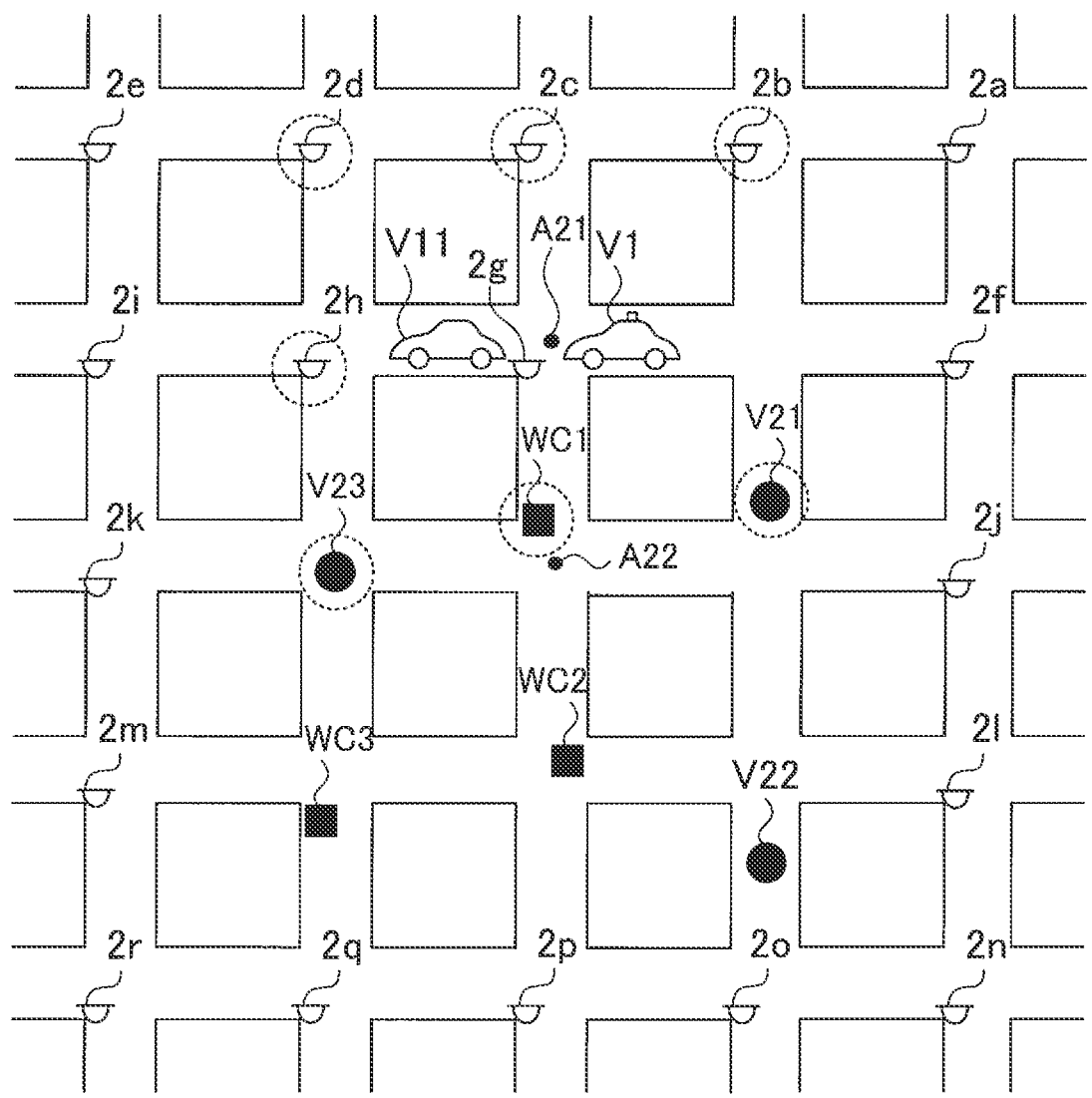
FIG. 13 is a view illustrating an example of outline operation of a tracking support system according to a third embodiment.

FIG. 13 is a view illustrating an example of outline operation of the tracking support system according to the third embodiment. Monitoring cameras 2a to 2r fixedly installed in the intersections of streets are shown in FIG. 13. Each of the monitoring cameras 2a to 2r corresponds to the monitoring camera 2 described referring to FIG. 1.

In FIG. 13, vehicles V1 and V21 to V23 patrolling streets are shown (the vehicles V21 to V23 are each indicated by a black circle). The vehicles V1 and V21 to V23 are, for example, police vehicles. The on-vehicle camera 1 described referring to FIG. 3 is mounted on each of the vehicles V21 to V23. A runaway vehicle V11 having caused an incident or an accident is shown in FIG. 13.

Furthermore, the wearable cameras WC1 to WC3 (indicated by black squares) possessed by police officers patrolling streets are also shown in FIG. 13. Each of the wearable cameras WC1 to WC3 has function blocks similar to those shown in FIG. 8.

Each of the vehicles V21 to V23 transmits the image data of the images photographed by the imaging section of the on-vehicle camera to the server 3. Furthermore, each of the vehicles V21 to V23 acquires the position information of each of the vehicles V21 to V23 periodically on the basis of the GPS signals. Each of the vehicles V21 to V23 transmits the acquired position information to the server 3. The server 3 stores the position information of the vehicles V21 to V23 in the storage section 33.

Each of the wearable cameras WC1 to WC3 transmits the image data of the images photographed by the imaging section to the server 3. Furthermore, each of the wearable cameras WC1 to WC3 acquires the position information of each of the wearable cameras WC1 to WC3 periodically on the basis of the GPS signals. Each of the wearable cameras WC1 to WC3 transmits the acquired position information to the server 3. The server 3 stores the position information of the wearable cameras WC1 to WC3 in the storage section 33.

The vehicle V1 herein finds the runaway vehicle V11 at the position A21 shown in FIG. 13 and starts the tracking of the vehicle. In response to the start of the tracking, the on-vehicle camera 1 of the vehicle V1 acquires the position information of the vehicle V1 on the basis of the GPS signals. For example, the on-vehicle camera 1 acquires the position information of the position A21.

The on-vehicle camera 1 transmits the position information of the vehicle V1 acquired on the basis of the GPS signals to the server 3. Furthermore, the on-vehicle camera 1 transmits the image data photographed by the imaging section 1b to the server 3. The image data to be transmitted to the server 3 includes the image of the runaway vehicle V11.

The server 3 searches for the image of the runaway vehicle V11 included in the image data transmitted from the on-vehicle camera 1 from the images photographed by the cameras existing around the position indicated by the position information transmitted from the on-vehicle camera 1 and selected from among the monitoring cameras 2a to 2r installed in the streets, the on-vehicle cameras of the vehicles V21 to V23 patrolling the streets and the wearable cameras WC1 to WC3 of the police officers patrolling the streets. In the following descriptions, the on-vehicle cameras of the vehicles V21 to V23 and the wearable cameras WC1 to WC3 are sometimes referred to as support cameras or mobile cameras.

For example, the server 3 searches for the image of the runaway vehicle V11 from the images photographed by the monitoring cameras and the support cameras existing within a predetermined distance (for example, within a circle having a radius of 1 km) from the position A21, the monitoring cameras being selected from among the monitoring cameras 2a to 2r installed in the streets. More specifically, the server 3 searches for the image of the runaway vehicle V11 from the images photographed by the monitoring cameras 2b to 2d and 2h, the on-vehicle cameras of the vehicles V21 and V23 and the wearable camera WC1 enclosed with broken-line circles in FIG. 13 and existing within the predetermined distance from the position A21 and selected from among the monitoring cameras 2a to 2r, the on-vehicle cameras of the vehicles V21 to V23 and the wearable cameras WC1 to WC3.

In other words, the server 3 searches for the image of the runaway vehicle V11 from the images photographed by the monitoring cameras and the support cameras existing around the position where the vehicle V1 started the tracking of the runaway vehicle V11.

After searching for the image of the runaway vehicle V11, the server 3 tracks the runaway vehicle V11 searched for using the images photographed by the monitoring cameras 2a to 2r, the images photographed by the on-vehicle cameras of the vehicles V21 to V23 and the images photographed by the wearable cameras WC1 to WC3. For example, the server 3 monitors the images photographed by the monitoring cameras and the support cameras existing within the predetermined distance (for example, within a circle having a radius of 1 km) from the moving runaway vehicle V11 and tracks the runaway vehicle V11. The server 3 can grasp the positions of the moving support cameras from the position information of the support cameras transmitted from the support cameras.

In other words, when the vehicle V1 starts the tracking of the runaway vehicle V11, the server 3 tracks the runaway vehicle V11 using the images photographed by the monitoring cameras 2a to 2p installed in the streets and the images photographed by the support cameras, independently from the vehicle V1.

In the case that the on-vehicle camera 1 of the vehicle V1 has missed the position of the runaway vehicle V11, the on-vehicle camera 1 requests the position information of the runaway vehicle V11 to the server 3. For example, in the case that the imaging section 1b does not photograph the runaway vehicle V11 for a certain period, the on-vehicle camera 1 determines that the on-vehicle camera 1 has missed the position of the runaway vehicle V11 and requests the position information of the runaway vehicle V11 to the server 3.

Upon receiving the request for the position information of the runaway vehicle V11 from the on-vehicle camera 1 of the vehicle V1, the server 3 acquires the position information of the runaway vehicle V11. For example, the server 3 acquires the position information of the monitoring camera photographing the runaway vehicle V11. More specifically, when the vehicle V1 has missed the position of the runaway vehicle V11, the runaway vehicle V11 is traveling at the position A22 shown in FIG. 13. The wearable camera WC1 photographs the runaway vehicle V11. In this case, the server 3 acquires the position information of the wearable camera WC1. The server 3 transmits the acquired position information to the on-vehicle camera 1 of the vehicle V1. The position information of the wearable camera WC1 is transmitted to the server 3 periodically as described above.

Upon receiving the position information from the server 3, the on-vehicle camera 1 of the vehicle V1 displays the received position information on the display device. Or the on-vehicle camera 1 outputs the position information received from the server 3 by voice. Hence, for example, the vehicle V1 having missed the position of the runaway vehicle V11 can go to the position of the wearable camera WC1 shown in FIG. 13.

As described above, even in an area of the streets where the monitoring cameras 2 do not exist, the server 3 transmits the position information of the runaway vehicle V11 to the vehicle V1 using the support camera.

Figure 14:
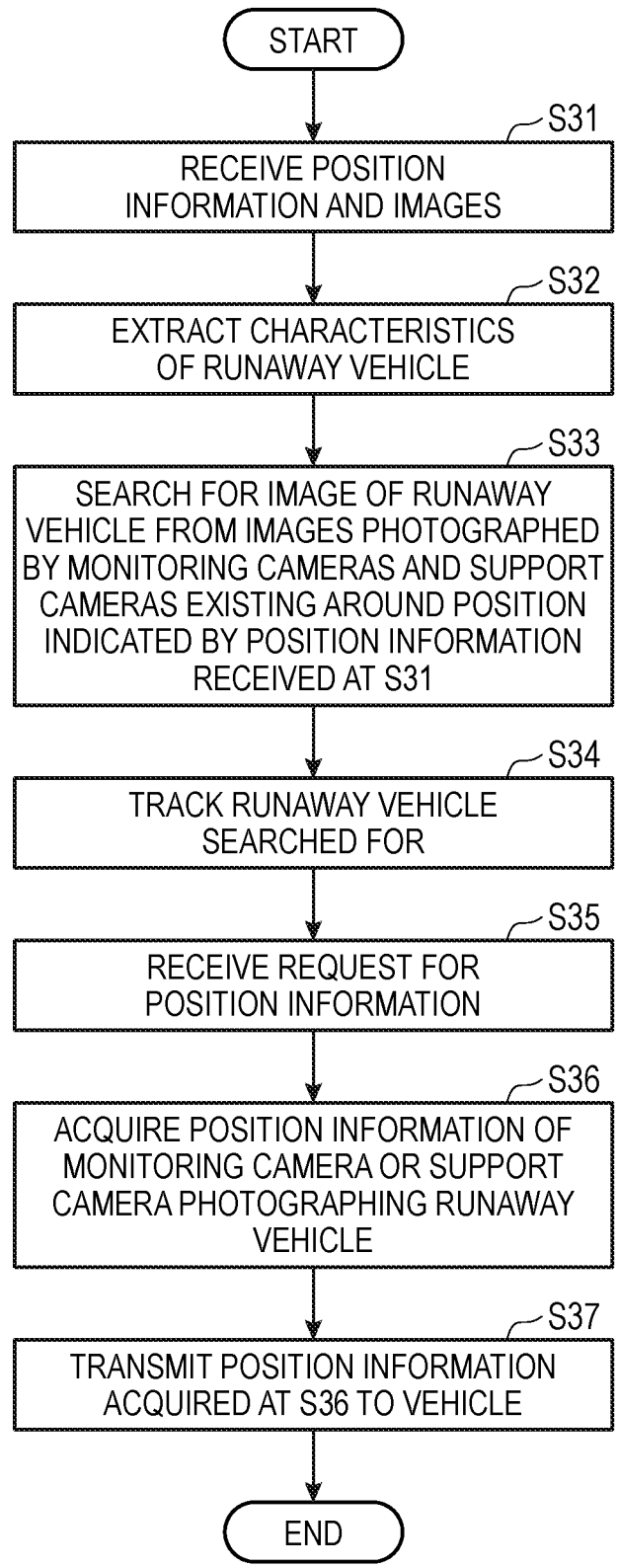
FIG. 14 is a flow chart showing an operation example of the server.

FIG. 14 is a flow chart showing an operation example of the server 3. The support cameras acquire the position information of the support cameras periodically on the basis of the GPS signals and transmit the position information to the server 3. The control section 31 of the server 3 stores the position information periodically transmitted from the support cameras in the storage section 33 so that the position information corresponds to the identification information of the support cameras. Furthermore, the server 3 receives image data from the support cameras.

Since the processes at steps S31 and S32 shown in FIG. 14 are similar to the processes at steps S1 and S2 shown in FIG. 6, the descriptions thereof are omitted.

The control section 31 of the server 3 extracts the monitoring cameras 2 and the support cameras existing around the position indicated by the position information received at step S31. For example, the control section 31 of the server 3 extracts the monitoring cameras 2 and the support cameras existing within a predetermined distance (for example, within a circle having a radius of 1 km) from the position indicated by the position information received at step S31. After extracting the monitoring cameras 2 and the support cameras, the control section 31 of the server 3 receives image data from the extracted monitoring cameras 2 and support cameras and searches for the image of the vehicle having the characteristics of the runaway vehicle extracted at step S32. In other words, the control section 31 of the server 3 searches for the image of the runaway vehicle from the images photographed by the monitoring cameras and the support cameras existing around the position indicated by the position information received at step S31 (at step S33).

The control section 31 of the server 3 tracks the vehicle searched for at step S33 using the images photographed by the monitoring cameras 2 and the support cameras (at step S34). For example, the control section 31 of the server 3 monitors the images photographed by the monitoring cameras and the support cameras existing within the predetermined distance from the moving runaway vehicle and tracks the runaway vehicle. The control section 31 of the server 3 can grasp the positions of the moving support cameras from the position information transmitted periodically from the support cameras.

In the case that the vehicle V1 has missed the position of the runaway vehicle, the control section 11 of the vehicle V1 requests the position information of the runaway vehicle to the server 3 via the communication section 12.

The control section 31 of the server 3 receives the request for the position information from the on-vehicle camera 1 of the vehicle V1 via the communication section 32 (at step S35).

Upon receiving the request for the position information from the on-vehicle camera 1 of the vehicle V1, the control section 31 of the server 3 acquires the position information of the monitoring camera 2 or the support camera photographing the runaway vehicle (at step S36). For example, the control section 31 of the server 3 refers to the data stored in the storage section 33 on the basis of the identification information of the monitoring camera 2 or the support camera photographing the runaway vehicle and acquires the position information of the monitoring camera 2 or the support camera photographing the runaway vehicle.

After acquiring the position information from the monitoring camera 2 or the support camera, the control section 31 of the server 3 transmits the acquired position information to the on-vehicle camera 1 of the vehicle V1 (at step S37).

As described above, the control section 31 of the server 3 searches for the image of the runaway vehicle included in the image data received from the vehicle V1 from the images photographed by the monitoring cameras and the support cameras existing around the position indicated by the position information received from the vehicle V1. After that, the control section 31 of the server 3 tracks the runaway vehicle searched for using the images photographed by the monitoring cameras and the support cameras existing in the streets. Hence, even in an area of the streets where the monitoring cameras 2 do not exist, the server 3 can transmit the position information of the runaway vehicle to the vehicle V1 using the support cameras.

Modification Example 1

In the above description, in the case that the vehicle V1 has missed the position of the runaway vehicle, the server 3 transmits the position information of the runaway vehicle to the vehicle V1. On the other hand, in the case that a police officer patrolling streets has missed the position of a runaway person, the server 3 may transmit the position of the runaway person to the wearable camera 40 possessed by the police officer.

Figure 15:
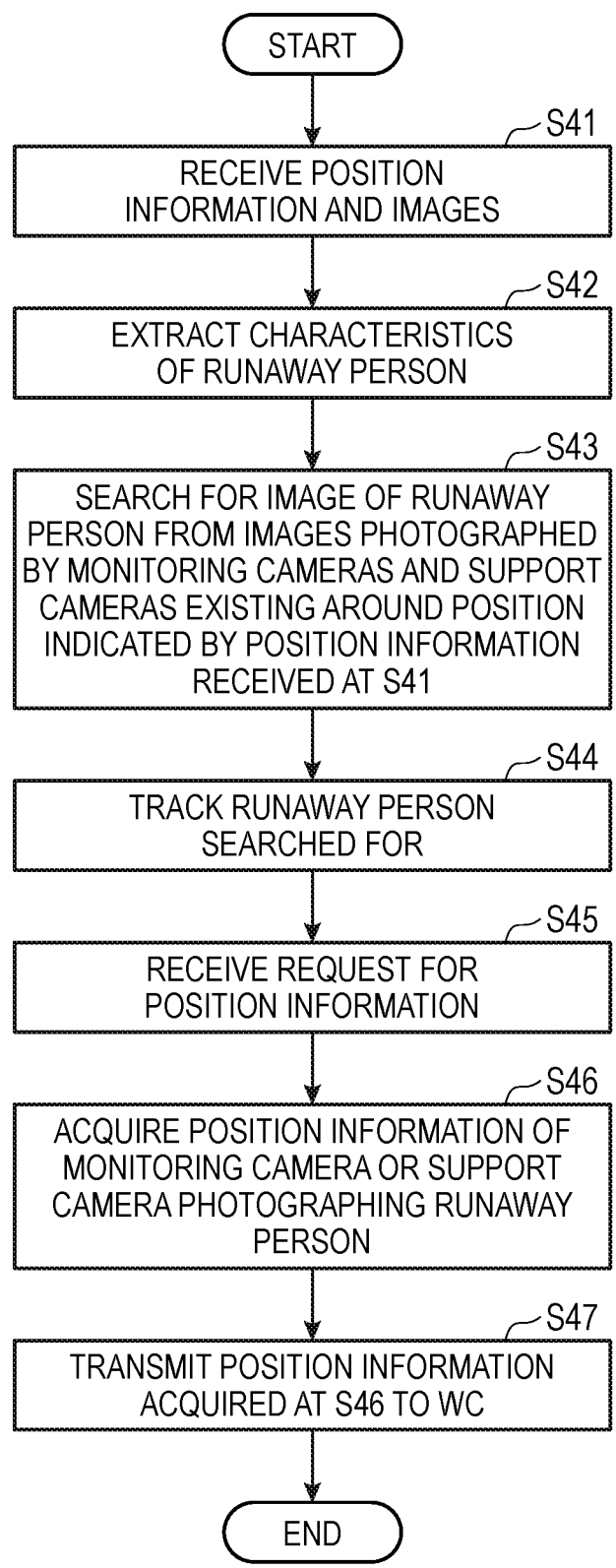
FIG. 15 is a flow chart showing an operation example of the server.

FIG. 15 is a flow chart showing an operation example of the server 3. The support cameras acquire the position information of the support cameras periodically on the basis of the GPS signals and transmit the position information to the server 3.

Since the processes at steps S41 and S42 shown in FIG. 15 are similar to the processes at steps S11 and S12 shown in FIG. 9, the descriptions thereof are omitted.

The control section 31 of the server 3 extracts the monitoring cameras 2 and the support cameras exiting around the position indicated by the position information received at step S41. For example, the control section 31 of the server 3 extracts the monitoring cameras 2 and the support cameras existing within a predetermined distance (for example, within a circle having a radius of 1 km) from the position indicated by the position information received at step S41. After extracting the monitoring cameras 2 and the support cameras, the control section 31 of the server 3 receives image data from the extracted monitoring cameras 2 and support cameras and searches for the image of the person having the characteristics of the runaway person extracted at step S42. In other words, the control section 31 of the server 3 searches for the image of the runaway person from the images photographed by the monitoring cameras and the support cameras existing around the position indicated by the position information received at step S41 (at step S43).

The control section 31 of the server 3 tracks the person (runaway person) searched for at step S43 using the images photographed by the monitoring cameras 2 and the support cameras (at step S44). For example, the control section 31 of the server 3 monitors the images photographed by the monitoring cameras and the support cameras existing within the predetermined distance from the moving runaway person and tracks the runaway person. The control section 31 of the server 3 can grasp the positions of the moving support cameras from the position information transmitted periodically from the support cameras.

In the case that the police officer has missed the position of the runaway person, the control section 41 of the wearable camera 40 requests the position information of the runaway person to the server 3 via the communication section 48.

The control section 31 of the server 3 receives the request for the position information from the wearable camera 40 via the communication section 32 (at step S45).

Upon receiving the request for the position information from the wearable camera 40, the control section 31 of the server 3 acquires the position information of the monitoring camera 2 or the support camera photographing the runaway person (at step S46). For example, upon receiving the request for the position information from the wearable camera 40, the control section 31 of the server 3 accesses the monitoring camera 2 or the support camera having photographed the runaway person and acquires the position information of the monitoring camera 2 or the support camera from the accessed monitoring camera 2 or the accessed support camera.

After acquiring the position information from the monitoring camera 2 or the support camera, the control section 31 of the server 3 transmits the acquired position information to the wearable camera 40 (at step S47).

Modification Example 2

The support camera may be applied to the second embodiment. For example, after acquiring the position information of the position information of the monitoring camera having photographed a hit-and-run incident, the server 3 may search for the image of the runaway vehicle from the images photographed by the monitoring cameras and the support cameras existing around the position indicated by the acquired position information.

Figure 16:
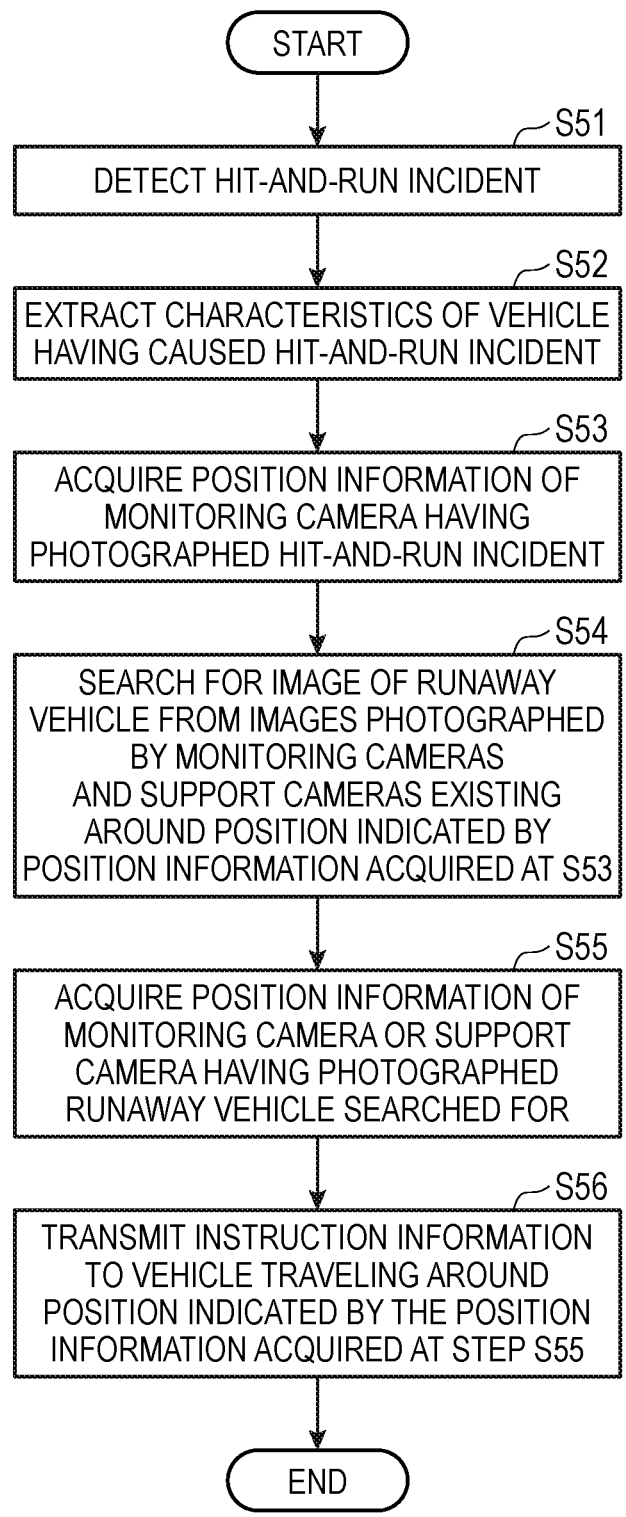
FIG. 16 is a flow chart showing an operation example of the server.

FIG. 16 is a flow chart showing an operation example of the server 3. The support cameras acquire the position information of the support cameras periodically on the basis of the GPS signals and transmit the position information to the server 3.

Since the processes at steps S51 to S53 shown in FIG. 16 are similar to the processes at steps S21 to S23 shown in FIG. 12, the descriptions thereof are omitted.

The control section 31 of the server 3 searches for the runaway vehicle from the images photographed by the monitoring cameras 2 installed around the position indicated by the position information acquired at step S53 (at step S54). For example, the control section 31 of the server 3 searches for the image of the vehicle (runaway vehicle) having characteristics being coincident with the characteristics extracted at step S52 from the images photographed by the monitoring cameras and the support cameras existing within a predetermined distance (for example, within a circle having a radius of 1 km) from the position of the monitoring camera 2 having photographed the hit-and-run incident.

After searching for the image of the runaway vehicle, the control section 31 of the server 3 acquires the position information of the monitoring camera 2 or the support camera having photographed the runaway vehicle searched for (at step S55). For example, the control section 31 of the server 3 accesses the monitoring camera 2 or the support camera having photographed the runaway vehicle searched for and acquires the position information of the place where the monitoring camera 2 is installed or the position information of the support camera from the accessed monitoring camera 2 or the accessed support camera. The control section 31 of the server 3 can grasp the positions of the moving support cameras from the position information transmitted periodically from the support cameras.

The control section 31 of the server 3 transmits instruction information instructing that the on-vehicle camera 1 of the vehicle V1 traveling around the position indicated by the position information acquired at step S25 should track the runaway vehicle (at step S56). The instruction information includes the position information of the monitoring camera 2 or the position information of the support camera having acquired at step S55. Furthermore, the instruction information may include image information, such as a still image, in which the runaway vehicle V11 is photographed.

Modification Example 3

Although the on-vehicle camera of the vehicle and the wearable camera possessed by the police officer are used as the support camera in the above descriptions, the support camera is not limited to these cameras. For example, either the on-vehicle camera or the wearable camera may be used as the support camera.

The function blocks used for describing the above-mentioned embodiments are achieved typically as integrated circuits (LSI). These may be formed into chips individually or may be formed into a single chip so as to include some or all of the function blocks. Although the integrated circuit is herein referred to as LSI, the integrated circuit may also be referred to as IC, system IC, super LSI or ultra LSI depending on the degree of integration.

Furthermore, the circuit integration method is not limited to the LSI production method, and integrated circuits may be achieved by using dedicated circuits or general-purpose processors. It may be possible to use FPGA (Field Programming Gate Array) capable of being programed after LSI production or to use a reconfigurable processor in which the connections and settings of the circuit cells inside the LSI can be reconfigured after LSI production.

Moreover, if an integrated circuit production technology replacing the LSI production technology is developed by the progress of the semiconductor technology or by separate technologies derived from the semiconductor technology, the function blocks may be integrated by using the technology as a matter of course. For example, it may be possible that biotechnology is applied to the integration.

Still further, the above-mentioned embodiments and modification examples may be combined. What's more, a program describing the processes of the functions to be possessed by the server 3 is provided. The above-mentioned processing functions (tracking support methods) are achieved on a computer by executing the program on the computer.

What is claimed is:

1. An information processing device comprising:
   a receiver, which, in operation, receives, from a second vehicle that started a tracking of a first vehicle, position information of the second vehicle and image data that includes images of the first vehicle photographed by an on-vehicle camera mounted on the second vehicle;
   circuitry, which, in operation, searches, using the image data, for an image of the first vehicle from images photographed by a plurality of monitoring cameras installed around a position indicated by the position information, and tracks the first vehicle using the images photographed by the plurality of monitoring cameras; and
   a transmitter, which, in operation, transmits tracking position information of the first vehicle to the second vehicle, the tracking position information including position information of a monitoring camera of the plurality of monitoring cameras that photographed the image of the first vehicle.

2. The information processing device according to claim 1, wherein
   the transmitter transmits the tracking position information to the second vehicle in response to a request from the second vehicle.

3. The information processing device according to claim 1, wherein
   the circuitry, in operation, determines a driving direction of the first vehicle from the image of the first vehicle, and
   the tracking position information includes the driving direction.

4. The information processing device according to claim 1, wherein
   the circuitry, in operation, searches for the image of the first vehicle from the images photographed by the plurality of monitoring cameras installed around the position indicated by the position information and images photographed by mobile cameras existing around the position indicated by the position information, and tracks the first vehicle using the images photographed by the plurality of monitoring cameras and the mobile cameras.

5. An information processing device comprising:
   circuitry, which, in operation, determines a first vehicle is involved in an incident from images photographed by a first monitoring camera, searches for an image of the first vehicle from images photographed by a plurality of monitoring cameras that are within a threshold distance from the first monitoring camera, and acquires installation position information of a second monitoring camera that photographed the image of the first vehicle; and
   a transmitter, which, in operation, transmits instruction information instructing tracking of the first vehicle to a second vehicle that is within a threshold distance from a position indicated by the installation position information.

6. The information processing device according to claim 5, wherein
   the instruction information includes the installation position information.

7. The information processing device according to claim 5, wherein
   the circuitry, in operation, detects an occurrence of the incident by analyzing the images photographed by the first monitoring camera.

8. The information processing device according to claim 5, wherein
   the circuitry, in operation, searches for the image of the first vehicle by using characteristics of the first vehicle transmitted from a terminal device.

9. The information processing device according to claim 5, wherein
   the circuitry, in operation, determines a runaway direction of the first vehicle from the image of the first vehicle, and
   the instruction information includes the runaway direction.

10. An information processing device comprising:
    a receiver, which, in operation, receives, from a wearable camera possessed by a second person that started a tracking of a first person, position information of the wearable camera and image data that includes images of the first person photographed by the wearable camera,
    circuitry, which, in operation, searches, using the image data, for an image of the first person from images photographed by a plurality of monitoring cameras installed around a position indicated by the position information, and tracks the first person using the images photographed by the plurality of monitoring cameras; and
    a transmitter, which, in operation, transmits tracking position information of the first person to the wearable camera, the tracking position information including position information of a monitoring camera of the plurality of monitoring cameras that photographed the image of the first person.

11. An information processing device comprising:
    circuitry, which, in operation determines a person is involved in an incident from images photographed by a first monitoring camera, searches for an image of the person from images photographed by a plurality of monitoring cameras that are within a threshold distance from the first monitoring camera, and acquires installation position information of a second monitoring camera that photographed the image of the person; and
    a transmitter, which, in operation, transmits instruction information instructing tracking of the person to a wearable camera or a vehicle that is within a threshold distance from a position indicated by the installation position information.

* * * * *